United States Patent
Ide

(10) Patent No.: US 7,146,148 B2
(45) Date of Patent: Dec. 5, 2006

(54) LOW INTERMEDIATE FREQUENCY TYPE RECEIVER

(75) Inventor: Teruji Ide, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 450 days.

(21) Appl. No.: 10/674,823

(22) Filed: Oct. 1, 2003

(65) Prior Publication Data
US 2004/0121738 A1  Jun. 24, 2004

(30) Foreign Application Priority Data
Oct. 1, 2002  (JP) .................... P. 2002-288254
Feb. 28, 2003  (JP) .................... P. 2003-052654

(51) Int. Cl.
*H04B 1/10* (2006.01)

(52) U.S. Cl. ................. 455/302; 455/314; 375/346

(58) Field of Classification Search ............. 455/302, 455/296, 314, 315; 375/346, 345
See application file for complete search history.

(56) References Cited

U.S. PATENT DOCUMENTS

| | | | |
|---|---|---|---|
| 6,427,068 B1 * | 7/2002 | Suominen | 455/302 |
| 6,563,887 B1 * | 5/2003 | Casagrande | 375/334 |
| 6,654,594 B1 * | 11/2003 | Hughes et al. | 455/245.1 |
| 6,785,529 B1 * | 8/2004 | Ciccarelli et al. | 455/324 |

FOREIGN PATENT DOCUMENTS

| | | |
|---|---|---|
| JP | 5-175785 | 7/1993 |
| JP | 5-299973 | 11/1993 |
| JP | 10-70482 | 3/1998 |
| JP | 10-209815 | 8/1998 |
| JP | 10-209904 | 8/1998 |
| JP | 2001-77667 | 3/2001 |
| JP | 2001-77717 | 3/2001 |

* cited by examiner

*Primary Examiner*—Nguyen T. Vo
*Assistant Examiner*—Adeel Haroon
(74) *Attorney, Agent, or Firm*—Jacobson Holman PLLC

(57) ABSTRACT

There is disclosed a receiver which solves such a problem as to strictly realize channel selection filter characteristics in extracting a narrow band signal from a broad band signal by digital signal processing in a conventional direct conversion circuit and which improves an image rejection ratio and which can reduce a load of hardware or processing to realize a channel selection filter for extracting the narrow band signal.

In a digital signal processing section, one set or a plurality of sets of an image rejection section, a frequency conversion section, and a rate conversion section are continuously connected. A narrow band signal of a desired wave is extracted from a broad band signal whose sampling frequency is lowered, and an offset provided at a local oscillator at the time of quadrature detection is removed in the receiver.

5 Claims, 17 Drawing Sheets

FIG.3A SIGNAL AFTER FREQUENCY CONVERSION PROCESSING BY ANALOG PROCESSING (LOCAL OSCILLATOR)
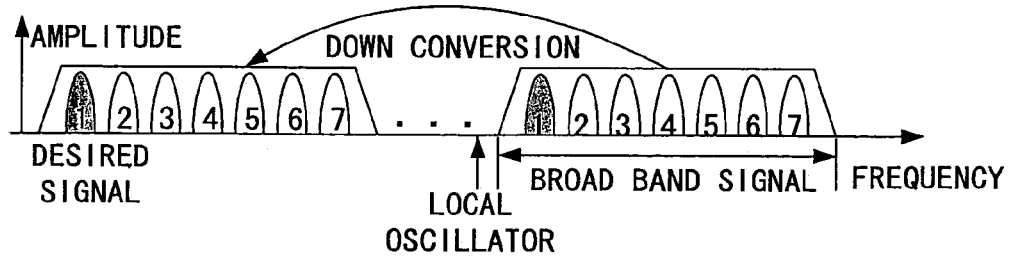
FIG.3B SIGNAL AFTER AD CONVERSION
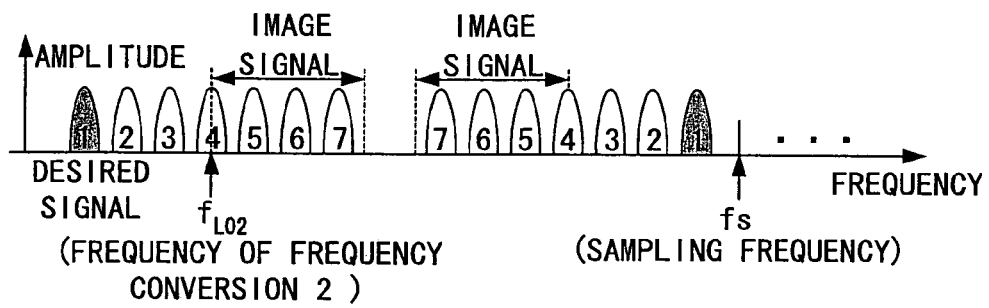
FIG.3C SIGNAL AFTER IMAGE REJECTION PROCESSING, COMPLEX FREQUENCY CONVERSION, RATE CONVERSION PROCESSING (FIRST)
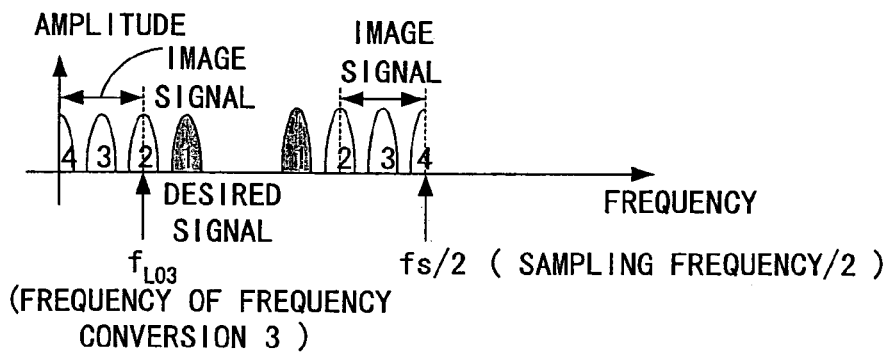
FIG.3D SIGNAL AFTER IMAGE REJECTION PROCESSING, COMPLEX FREQUENCY CONVERSION, RATE CONVERSION PRECESSING (SECOND)
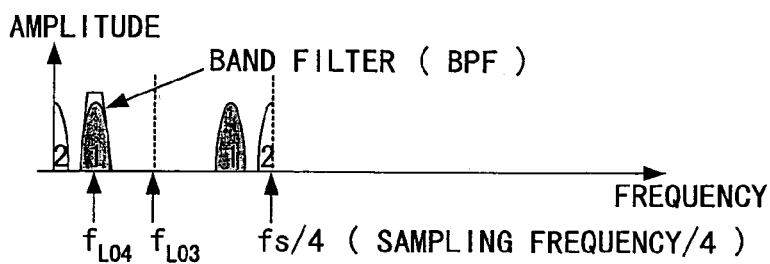

LOW INTERMEDIATE FREQUENCY TYPE RECEIVER

BACKGROUND OF THE INVENTION

1. Field of the Invention

The present invention relates to a receiver including a direct conversion circuit for use in a receiver which performs quadrature demodulation, and more particularly to a receiver which can improve an image signal rejection ratio and further reduce a load of hardware or processing.

2. Description of the Related Art

In a conversion circuit of a direct conversion system which is one of conversion systems for use in a receiver, and the like, when a modulated ratio wave is received, almost the same frequency of a carrier wave signal (local frequency) as that of a central frequency (desired reception frequency) of this received signal is output by a local oscillator, so that the received signal and a local oscillation signal from this local oscillator are mixed to thereby convert a reception wave in an RF band directly into a base band signal, which is then detected and demodulated.

By such a direct conversion system, however, since the frequency of a carrier wave output from the local oscillator is the same as a desired reception frequency, such a direct current (DC) offset phenomenon occurs that the output from the local oscillator is input again to another input of a multiplication process and multiplied again by the output of the local oscillator to thereby offset a DC component of the base band signal or such a fundamental problem occurs that 1/f noise is generated because an intermediate frequency of the base band signal obtained by the multiplication is nearly zero (0). This has made it difficult to receive signals stably in a broad band.

To solve the problem, there is a direct conversion circuit employing a low intermediate frequency (IF) system.

By a direct conversion method of the low IF system, an offset frequency (difference in frequency) having such an extent as not to generate a DC offset or 1/f noise is given between a desired reception frequency and a frequency output by the local oscillator, then converted to a low IF, so that the reception signal is converted in frequency by digital signal processing using the offset frequency. Accordingly, in-phase and quadrature outputs are obtained.

In the low IF system, however, it is necessary to suppress an image signal at an image frequency so that it may not overlap with the desired signal.

The above-described conventional direct conversion of the low IF system has a problem that it is difficult to sufficiently attenuate an image frequency signal contained in a reception signal with respect to a desired wave at a band pass filter. Therefore, it may sometimes be necessary to vary the intermediate frequency, band, and the like of the band pass filter.

That is, it is difficult to obtain wide band characteristics of a receiver including the direct conversion and so to implement a wide band low IF receiver.

To solve the above-mentioned problem of the image frequency signal, there is such a method as to give processing way for rejecting the image signal.

By this method, for example, in the low IF-type direct conversion receiver, a desired reception signal is multiplied by a local-oscillator's frequency provided with an offset frequency to be down-converted into an low-IF signal, which then undergoes image signal rejection and then digital signal processing to convert the offset frequency, thus obtaining in-phase and quadrature outputs.

Note here that one conventional technology related to a direct detection-system receiver is disclosed in Japanese Patent Application Laid-Open No. Hei 10-70482 published on Mar. 10, 1998 (Applicant: Philips Electronics., Nemrose, Fennohtsharp, Inventor: Paul, Anthony, Moore, et al.).

This conventional technology provides an integrated receiver using a local oscillator which oscillates an intermediate frequency of a desired signal wave higher than that of an interference signal wave directly detected to thereby down-convert the frequency of an input signal. Accordingly, the influence of an interference signal can be removed (see Patent Document 1).

Moreover, another conventional technology related to the direct conversion system is described in Japanese Patent Application Laid-Open No. 2001-77717 titled "Receiver" laid-open on Mar. 23, 2001 (Applicant: Toshiba Corp., Inventors: Hiroshi Tsurumi, et al.).

According to this conventional technology, there is provided a receiver for collectively receiving a system band which is an object to select a channel by digital processing. In the receiver, after the received signal is quadrature-demodulated at a local frequency, the image signal is suppressed. Alternatively, after the quadrature-demodulated signal is converted to a digital signal, the image signal is suppressed. A desired channel is demodulated by the digital processing, and selected. Accordingly, a broad band is collectively received, and flexible processing by the digital processing is possible. Moreover, sufficient image signal suppression is obtained (see Patent Document 2).

Furthermore, the conventional technology of a decimation filter related to the present invention is described in: Japanese Patent Application Laid-Open No. 5-175785 titled "Digital Filter for Decimation" laid-open on Jul. 13, 1993 (Applicant: Matsushita Electric Industrial CO., Ltd., Inventors: Tetsuhiko Kaneaki, et al.) (see Patent Document 3); Japanese Patent Application Laid-Open No. 5-299973 titled "Decimation Filter" laid-open on Nov. 12, 1993 (Applicant: Fujitsu Ltd., Inventors: Nobukazu KOIZUMI, et al.) (see Patent Document 4); Japanese Patent Application Laid-Open No. 10-209815 titled "Decimation Filter" laid-open on Aug. 7, 1998 (Applicant: Matsushita Electric Industrial CO., Ltd., Inventors: Hideaki Hatanaka, et al.) (see Patent Document 5); Japanese Patent Application Laid-Open No. 2001-77667 titled "Decimation Filter" laid-open on Mar. 23, 2001 (Applicant: Hitachi, Ltd., Inventors: Haruhiro Hasegawa, et al.) (see Patent Document 6); and the like.

Additionally, the conventional technology related to a receiver for demodulating a digital modulation signal using a digital signal processing technology is described in Japanese Patent Application Laid-Open No. 10-209904 titled "Receiver" laid-open on Apr. 7, 1998 (Applicant: Hitachi Electronics, Ltd., Inventors: Hirotake Wakai, et al.).

According to the conventional technology, there is provided a receiver including means for limiting a band of a frequency-converted signal to that of an IF signal by a band pass filter. After A/D conversion, deviation of the intermediate frequency is corrected by a complex processing circuit, and the signal is filtered in a narrow base band by the digital filter to obtain a demodulated output. Accordingly, band pass processing is carried out with a broad-band analog filter, and narrow-band filter processing is carried out after the A/D conversion, so that manufacturing cost of the analog filter is reduced. The circuit which obviates necessity for an IF filter equalizer for correcting characteristics can be realized (see Patent Document 7).

Patent Documents 1 to 7 denote Japanese Patent Application Laid-Open Nos. 10-70482, 2001-77717, 5-175785, 5-299973, 10-209815, 2001-77667, and 10-209904, respectively.

In the conventional direct conversion circuit, however, since image rejection processing is analog processing, coefficient errors of the analog filter are generated by fluctuations of an analog device, and there exists a problem that an image rejection ratio is not sufficient.

For example, when the fluctuation of a device value is 1% in terms of an average value, such a problem occurs that an image signal suppression ratio of about 40 dB is a limit in the analog processing and efficiency of image signal rejection is bad.

SUMMARY OF THE INVENTION

Then, as a method for solving a problem that the image signal-rejection ratio is not sufficient because of the coefficient error of the analog filter, there has been proposed a direct conversion circuit for processing the digital signal to remove the image signal so that the image signal rejection ratio is enhanced.

In the direct conversion circuit proposed, the image signal is rejected by the processing of the digital signal in the receiver of the low IF system.

In the proposed direct conversion circuit, the digital signal is processed to reject the image signal. Therefore, the image signal suppression ratio of about 60 dB is possible. However, with the low IF system constituted as a broad-band receiver, when a broad-band signal is converted down and subsequently the desired wave is selected by a channel selection filter, a filter having strict characteristics of the narrow band by the digital signal processing is required, and a load onto the filter processing raises a problem.

Moreover, with the use of the method for processing the digital signal to reject the image signal as in the proposed receiver of the low IF system, since a multiplier (mixer) or 90° phase shifter carries out the analog processing, phase and amplitude errors generated by the analog processing are not considered in rejecting the image signal.

The present invention has been developed in view of the above situation, and an object of the present invention is to provide a receiver which solves such a problem as to strictly realize channel selection filter characteristics in extracting a narrow band signal from a broad band signal by digital signal processing and which improves an image rejection ratio and which can reduce a load of hardware or processing to realize a channel selection filter for extracting the narrow band signal.

Moreover, another object is to provide a receiver for correcting phase and amplitude errors caused by analog devices such as a multiplier (mixer) and 90° phase shifter by digital signal processing so that the load of the hardware or processing is reduced and the image rejection ratio can also be improved.

According to the present invention, there is provided a receiver which converts a band to a base band by a local oscillator of a quadrature carrier wave signal to perform demodulation processing, comprising: a broad band limiting section which limits the band with respect to a received signal in a broad band; a first frequency conversion section which converts a frequency of the band-limited received signal into a low band at a local oscillation frequency having an offset with respect to a reception frequency; a digital conversion section which converts the frequency-converted received signal to a digital signal at a specific sampling frequency; an image rejection section which subjects the digital signal to image rejection processing; a narrow band limiting section which extracts a narrow band signal of a desired wave from an image-rejected broad band signal; a second frequency conversion section which performs frequency conversion processing to remove the offset from the narrow band signal; a third frequency conversion section which reduces the frequency with respect to the image-rejected signal; and a rate conversion section which subjects an output from the third frequency conversion section to rate conversion to lower the sampling frequency, wherein the narrow band limiting section extracts the narrow band signal of the desired wave from the rate-converted broad band signal, so that an image rejection ratio is improved and further a load of hardware or processing for realizing a channel selection filter to extract the narrow band signal can be reduced.

According to the present invention, in the receiver, a plurality of sets of the image rejection section, third frequency conversion section, and rate conversion section are continuously connected and disposed, so that the image rejection ratio is further improved and further the load of the hardware or processing for realizing the channel selection filter to extract the narrow band signal can be reduced.

According to the present invention, in the receiver, the image rejection section includes: a HILBERT: filter which subjects a quadrature component of the inputted digital signal to 90-degrees phase shift processing by HILBERT conversion; a delay unit which delays and outputs an in-phase component of the inputted digital signal by the same time as a delay time in the HILBERT filter; and an adder which performs addition/subtraction with respect to outputs from the HILBERT filter and delay unit. Since the processing for rejecting an image frequency signal is carried out by the digital signal processing, the image rejection ratio can be improved.

According to the present invention, in the receiver, the rate conversion section is a decimation filter which lowers the sampling frequency by decimation-in-time processing. Therefore, the image rejection ratio is improved, while the load of the hardware or processing for realizing the channel selection filter to extract the narrow band signal by a simple configuration can be reduced.

According to the present invention, there is provided a receiver which converts a band to a base band by a local oscillator of a quadrature carrier wave signal to perform demodulation processing, comprising: a first frequency conversion section which converts a frequency to that of a low frequency band at a local oscillation frequency having an offset with respect to a reception frequency; an analog-digital conversion section which converts the frequency-converted received signal to a digital signal from an analog signal; a phase deviation correction processing section which corrects a phase deviation of the signal converted to the digital signal; an image rejection section which subjects the digital signal corrected in phase deviation to image rejection processing; a narrow band limiting section which extracts a band signal of a desired wave from the image-rejected broad band signal; and a second frequency conversion section which subjects the band signal of the desired wave to frequency conversion processing for removing the offset. Therefore, while the load of the hardware or processing is reduced, the phase deviation caused by an analog device is corrected, and the image rejection ratio can be improved.

According to the present invention, there is provided a receiver which converts a band to a base band by a local oscillator of a quadrature carrier wave signal to perform demodulation processing, comprising: a first frequency conversion section which converts a frequency to that of a low frequency band at a local oscillation frequency having an offset with respect to a reception frequency; an analog-digital conversion section which converts the frequency-converted received-signal to a digital signal from an analog signal; an amplitude deviation correction processing section which corrects an amplitude deviation with respect to the signal converted to the digital signal; an image rejection section which subjects-the digital signal corrected in the amplitude deviation to image rejection processing; a narrow band limiting section which extracts a band signal of a desired wave from an image-rejected broad band signal; and a second frequency conversion section which performs frequency conversion processing to remove the offset from the band signal of the desired wave. Therefore, while the load of the hardware or processing is reduced, the amplitude deviation caused by the analog device can be corrected to improve the image rejection ratio.

According to the present invention, there is provided a receiver which converts a band to a base band by a local oscillator of a quadrature carrier wave signal to perform demodulation processing, comprising: a first frequency conversion section which converts a frequency to that of a low frequency band at a local oscillation frequency having an offset with respect to a reception frequency; an analog-digital conversion section which converts a frequency-converted received signal to a digital signal from an analog signal; a phase deviation correction processing section which corrects a phase deviation with respect to the signal converted to the digital signal; an amplitude deviation correction processing section which corrects an amplitude deviation; an image rejection section which subjects the digital signal corrected in the phase and amplitude deviations to image rejection processing; a narrow band limiting section which extracts a band signal of a desired wave from an image-rejected broad band signal; and a second frequency conversion section which subjects the band signal of the desired wave to frequency conversion processing for removing the offset. Therefore, while the load of the hardware or processing is reduced, the amplitude and phase deviations caused by the analog device can be corrected to improve the image rejection ratio.

According to the present invention, in the receiver, the phase deviation correction processing section multiplies in-phase and quadrature components of the inputted digital signal to detect the phase deviation, multiplies the detected phase deviation by the in-phase component, and subtracts a multiplied result from the quadrature component to obtain a quadrature output. Therefore, while the load of the hardware or processing is reduced with simple configuration and processing, the phase deviation caused by the analog device can be corrected to improve the image rejection ratio.

According to the present invention, in the receiver, the amplitude deviation correction processing section calculates the amplitude deviation by a value of a difference between square values of the in-phase and quadrature components of the inputted digital signal, and multiplies the value obtained by subtraction or addition of a value of the amplitude deviation with respect to a value proportional to an input amplitude by the quadrature component to obtain the quadrature output.

Therefore, while the load of the hardware or processing is reduced with the simple configuration and processing, the amplitude deviation caused by the analog device can be corrected to improve the image rejection ratio.

BRIEF DESCRIPTION OF THE DRAWING

FIG. 3 is an-explanatory view showing processing results in the direct conversion circuit of the present invention on frequency spectrum;

DESCRIPTION OF REFERENCE NUMERALS

Figure 1:
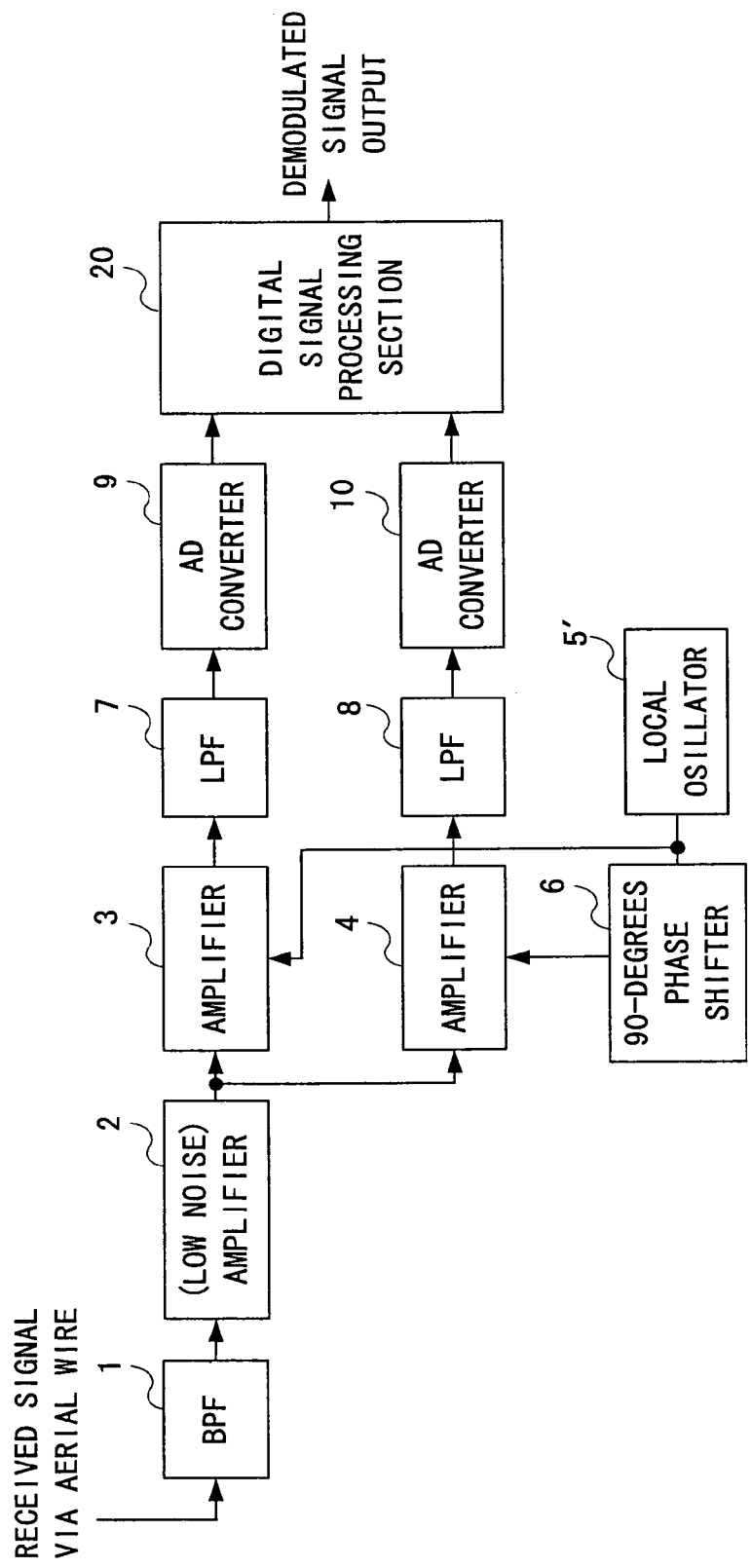
FIG. 1 is a configuration block diagram showing a principle configuration example of a direct conversion circuit according to a first embodiment of the present invention.

1 . . . band pass filter (BPF), 2 . . . amplifier, 3, 4 . . . multiplier, 5, 5' . . . local oscillator, 6 . . . 90° phase shifter, 7, 8 . . . low pass filter (LPF), 9, 10 . . . AD converter, 11 . . . base band demodulation section, 12 . . . frequency conversion processing section, 13, . . . 13' . . . image rejection processing section, 20, 20' . . . digital signal processing section, 21, 24 . . . image rejection processing section, 22, 25, 28 . . . complex frequency converter, 23, 26 . . . rate conversion processing section, 27a, 27b . . . band filter, 29 . . . demodulation processing section, 30 . . . delay unit, 31, 33 . . . adder, 32 . . . multiplier, 40, 44 . . . SIN table, 41, 43, 46, 47, 48, 49 . . . multiplier, 42, 45 . . . COS-table, 50 . . . subtractor, 51 . . . adder, 61, 81 . . . delay unit, 62, 82 . . . HILBERT filter, 63, 83 . . . adder, 71a, 71b . . . low pass filter, 72a, 72b . . . decimate processing section, 121 . . . amplitude correction processing: section, 122 . . . phase correction processing section, 123, 123' . . . image rejection processing section, 124 . . . complex; frequency conversion section, 125, 126 . . . low pass filter (LPF), 127, 127' . . . complex frequency conversion section, 128a, 128b . . . LPF, 129 . . . demodulation processing section, 131 . . . HILBERT filter, 132 . . . delay unit, 133 . . . adder, 141 . . . SIN table, 142 . . . COS table, 143, 144, 145, 146 . . . multiplier, 147, 148 . . . adder, 151 . . . coefficient a, 152 . . . coefficient b, 153, 154, 155, 156 . . . multiplier, 157, 158 . . . adder, 161, 162 . . . multiplier, 163 . . . adder, 164 . . . LPF, 165 . . . integrator, 166 . . . multiplier, 169 . . . control loop, 171, 173 . . . square unit, 172 . . . multiplier, 174 . . . subtractor, 175 . . . LPF, 176 . . . integrator, 177 . . . multiplier, 178 . . . adder, 179 . . . control loop, 183 . . . adder, 184, 186 . . . multiplier, 185 . . . delay unit, 188 . . . adder, 189 . . . delay unit, 193 . . . adder, 194, 196 . . . multiplier, 195 . . . delay unit, 198 . . . adder, 199 . . . delay unit

DESCRIPTION OF THE PREFERRED EMBODIMENT

Embodiments of the present invention will be described with reference to the drawings.

It is to be noted that function realization means described hereinafter may be any circuit or apparatus as long as a function can be realized, or the function may partially or wholly be realized by software. Furthermore, the function realization means may also be realized by a plurality of circuits, and a plurality of function realization means may also be realized by a single circuit.

First, a receiver including a direct conversion circuit according to a first embodiment of the present invention will be described.

For the receiver including the direct conversion circuit according to the first embodiment of the present invention, one set or a plurality of sets of an image rejection section for receiving a digital signal of an in-phase component and that of a quadrature component which are detected in a quadrature manner using a local oscillator for oscillating a carrier wave at a frequency of a reception frequency plus an offset to reject an image frequency signal included in a received signal by a digital signal processing section, a frequency conversion section for lowering the frequency with respect to an image-rejected signal, and a rate conversion section which converts a rate to lower a sampling frequency are continuously connected to one another to lower the sampling frequency. Subsequently, a narrow band signal of a desired wave is extracted from a broad band, signal, and the offset provided at a local oscillator at the time of quadrature detection is removed. Therefore, while an image rejection ratio is improved, a load of hardware or processing for realizing a channel selection filter to extract the narrow band signal can be reduced.

First, a principle configuration of the direct conversion circuit according to the first embodiment of the present invention will be described with reference to FIG. 1. FIG. 1 is a configuration block diagram showing the principle configuration example of the direct conversion circuit according to the first embodiment of the present invention.

As shown in FIG. 1, a low-IF type direct conversion circuit (the present circuit) according to the first embodiment of the present invention includes: a conventional configuration including a band pass filter (BPF) 1, amplifier 2, multiplier 3, multiplier 4, local oscillator 5', 90° phase shifter 6, low pass filter (LPF) 7, low pass filter 8, AD converter 9, and AD converter 10; and further a digital signal processing section 20 which is a characteristic part of the present invention.

It is to be noted that correspondence between components in the first embodiment and those of FIG. 1 will be described. A broad band limiting section corresponds to the band pass filter 1 and low noise amplifier 2, a first frequency conversion section corresponds to the multipliers 3, 4, local oscillator 5', 90° phase shifter 6, and low pass filters 7, 8, and a digital conversion section corresponds to the AD; converters 9, 10.

Next, the respective components of the present circuit will be described. First, the conventional, constituting components will be described.

The band pass filter 1 is of a typical type for filtering a received signal inputted through an aerial wire into required band and attenuation level to extract and output a signal in a desired frequency band.

The amplifier 2 is of a typical type which has a predetermined required amplification factor for the receiver.

The local oscillator 5' is of a typical type for outputting a carrier wave at the same frequency as a reception frequency.

The 90° phase shifter 6 shifts a signal outputted from the local oscillator 5' by 90° in phase.

The multiplier 3 multiplies the received signal and the carrier wave at the same frequency as the reception frequency outputted from the local oscillator 5' to output an in-phase component.

The multiplier 4 multiplies the-received signal and the carrier wave obtained by shifting the carrier wave at the same frequency as the reception frequency sent from the local oscillator 5' by 90° in phase by the 90° phase shifter 6 to output a quadrature component.

The low pass filter (LPF) 7 is of a typical type for rejecting a double wave of the in-phase component outputted from the multiplier 3.

The low pass filter (LPF) 8 is of a typical type for rejecting a double wave of the quadrature component outputted from the multiplier 4.

The AD converter 9 converts an analog signal into a digital one to output the digital signal of the in-phase component.

The AD converter 10 converts the analog signal into the digital one to output the digital signal of the quadrature component.

A basic operation of the conventional constituting components of the direct conversion circuit shown in FIG. 1 will be described. For the received signals inputted via the aerial wire, signals other than an image signal are rejected in accordance with the required band or attenuation level by the band pass filter (BPF) 1, and the signal is linearly amplified at a predetermined required amplification factor for the receiver in the amplifier 2.

Subsequently, the amplified received signal from the amplifier 2 is multiplied by the carrier wave at the reception frequency from the local oscillator 5' plus the offset frequency in the multiplier 3 to output the in-phase component. Moreover, the signal is multiplied by the carrier wave obtained by shifting the phase of the carrier wave from the local oscillator 5' by 90° by the 90° phase shifter 6 by the multiplier 4 to output the quadrature component.

Moreover, for the in-phase and quadrature components, the double wave is removed by the low pass filters 7, 8, the analog signal is converted to the digital signal by the AD converters 9, 10, and the in-phase and quadrature outputs of the digital signal are obtained.

Subsequently, in the "Direct Conversion Circuit" proposed in Japanese Patent Application No. 2002-083191, an image rejection section by digital processing is disposed in a rear stage of the AD converters 9 and 10 to reject the image signal by the digital signal processing. In a subsequent frequency conversion processing section, the frequency is converted by the offset frequency, demodulation processing is performed by a base band demodulation section, and the signal is outputted.

On the other hand, for the digital signal processing section 20 of the present invention, with respect to the digital signal of the in-phase and quadrature components of the received signal converted at the local oscillation frequency including the offset, image rejection processing for rejecting the image frequency signal (image signal) included in the received signal by the digital signal processing is combined with frequency conversion-processing and rate conversion (decimation) processing for lowering the sampling frequency. After carrying out the combined processing once or a plurality of times, frequency conversion processing is carried out to limit the band by the channel selection filter and to extract a desired wave signal and to remove the offset provided by the local oscillator. Finally, demodulation processing is carried out.

Figure 2:
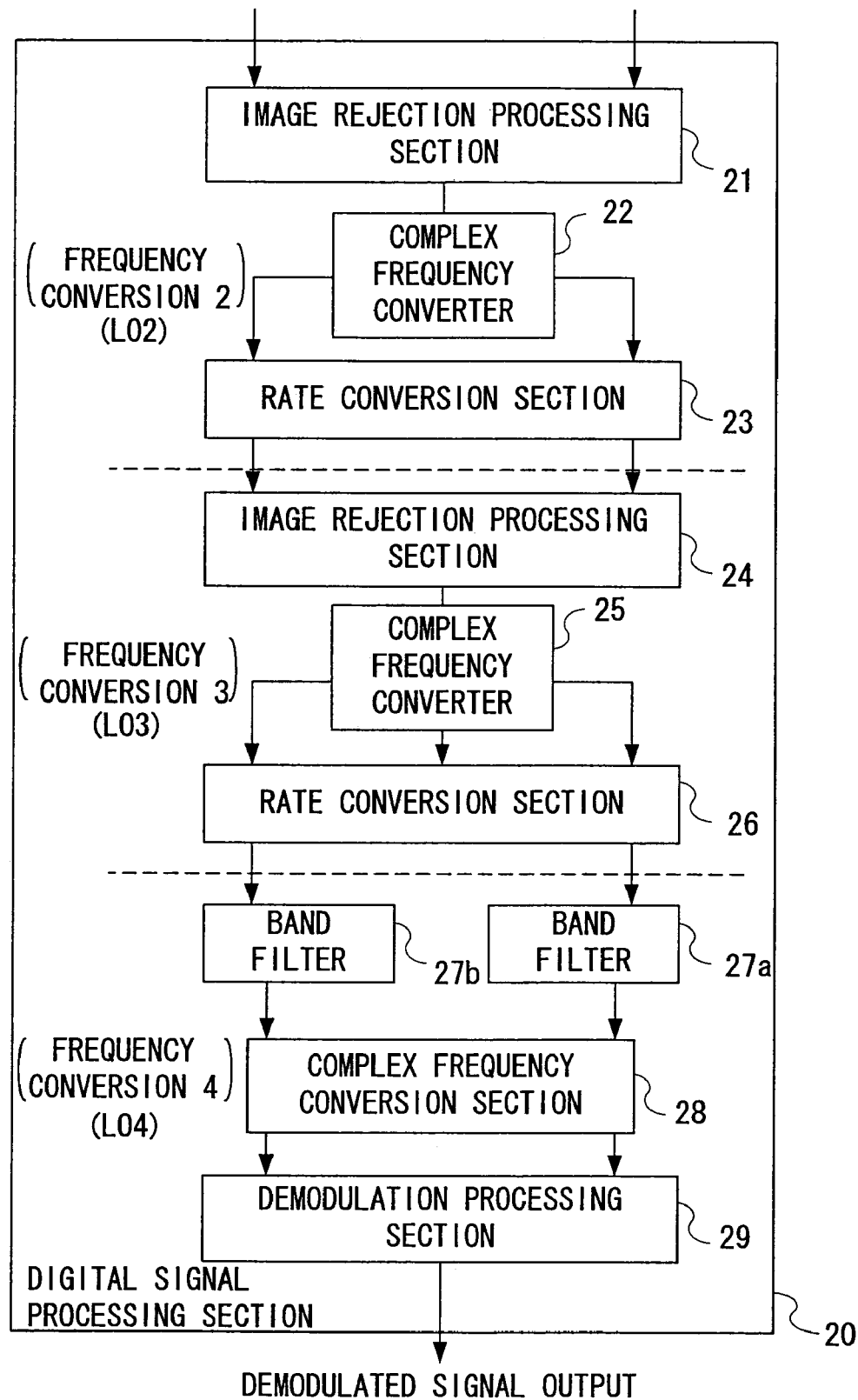
FIG. 2 is a block diagram showing an inner configuration example of a digital signal processing section in the direct conversion circuit according to the first embodiment of the present invention.

An inner configuration example of the digital signal processing section 20 in the direct conversion circuit according to the first embodiment of the present invention will be described with reference to FIG. 2. FIG. 2 is a block diagram showing the inner configuration example of the digital signal processing section 20 in the direct conversion circuit according to the first embodiment of the present invention. It is to be noted that FIG. 2 shows a configuration example in which the combination of the image rejection processing, frequency conversion processing, and rate conversion processing is disposed in two stages.

As shown in FIG. 2, the inner configuration example of the digital signal processing section 20 in the direct conversion circuit according to the first embodiment of the present invention is constituted of a first stage including: an image rejection processing section 21 for rejecting the image signal generated by frequency conversion in the previous stage; a complex frequency converter 22 for converting the frequency at a frequency LO2; and a rate conversion processing section 23 for lowering the sampling frequency by decimation-in-time processing. A second stage includes: an image rejection processing section 24; a complex frequency converter 25 for converting the frequency at a frequency LO3; and a rate conversion processing section 26. Furthermore, with respect to the in-phase and quadrature component signals, a subsequent stage is constituted of: band filters 27a, 27b for limiting the band to extract the desired wave signal; a complex frequency converter 28 for converting the frequency at a frequency LO4 to remove the offset provided at the local oscillator 5'; and a demodulation processing section 29 for carrying out demodulation processing.

It is to be noted that the correspondence between the respective components in the first embodiment of the present invention and the respective components of FIG. 2 will be described. An image rejection section corresponds to the image rejection processing sections 21, 24, a second frequency conversion section corresponds to the complex frequency converter 28, a narrow band limiting section corresponds to the band filters 27a, 27b, a third frequency conversion section corresponds to the complex frequency converters 22, 25, and a rage conversion section corresponds to the rate conversion processing sections 23, 26.

Next, an operation of the direct conversion circuit according to the first embodiment of the present invention will be described based on an operation principle with reference to FIGS. 1, 2, 3. FIG. 3 is an explanatory view showing processing results in the direct conversion circuit of the present invention on frequency spectrum. It is to be noted that FIG. 3 shows an example in which signals of seven channels are disposed as broad band signals and a first channel (hatched part in the drawing) is a desired channel (desired wave).

In the direct conversion circuit of the present invention, for the received signal inputted via the aerial wire, the signals other than the image signal are rejected at a desired band (on the right side of FIG. 3(*a*) [broad band signal]) and attenuation level by the band pass filter (BPF) 1, and the signal is linearly amplified at the predetermined amplification factor required for the receiver in the amplifier 2.

Subsequently, the amplified received signal from the amplifier 2 is multiplied by the carrier wave at the reception frequency from the local oscillator 5' plus the offset frequency in the multiplier 3 to output the in-phase component. Moreover, the signal is multiplied by the carrier wave obtained by shifting the phase of the carrier wave from the local oscillator 5' by 90° by the 90° phase shifter 6 by the multiplier 4 to output the quadrature component.

The received signal including the desired wave (hatched part in the drawing) is multiplied by the carrier wave at the frequency oscillated from the local oscillator 5' (reception frequency+offset), down-converted, and frequency-converted to a base band (on the left side of FIG. 3(*a*)). The desired wave (right hatched part in the drawing) is converted to an offset frequency band.

Subsequently, for the in-phase and quadrature components, the double wave is removed by the low pass filters 7, 8, the signal is sampled at a sampling frequency fs by the AD converter 10, and the analog signal is converted to the digital signal (FIG. 3(*b*)).

Here, assuming that the amplitude of the output signal of the local oscillator 5' is $V_C$, angular frequency is $\omega_C + \omega_{\Delta f}$, the amplitude of the signal component of a transmission signal is $V_S$, angular frequency is $\omega_{SS}$, the amplitude of the image signal component is $V_i$, and the angular frequency is $\omega_{Si}$ a received signal $V_{rf}$ inputted into the multipliers 3, 4 is represented by the following equation.

$$V_{rf} = V_i \cos(\omega_C - \omega_{Si})t + V_S \cos(\omega_C + \omega_{SS})t$$

Moreover, assuming that a conversion coefficient of the mixer in the multiplier 3 is K, an output $V_{MIX01}$ of the multiplier 3 is represented by the following equation.

$$V_{MIX01} = K \cdot \{V_i \cos(\omega_C - \omega_{Si})t + V_S \cos(\omega_C + \omega_{SS})t\} \cdot V_C \cos(\omega_C + \omega_{\Delta f})t$$

Furthermore, an output $V_{LPF01}$ of the low pass filter 7 after the double wave is removed from the output of the multiplier 3 is represented by the following equation.

$$V_{LPF01} = \{(K \cdot V_i \cdot V_C)/2\} \cdot \cos(\omega_{Si} + \omega_{Af})t + \{(K \cdot V_S \cdot V_C)/2\} \cdot \cos(\omega_{Af} - \omega_{SS})t$$

On the other hand, assuming that the conversion coefficient of the mixer in the multiplier 4 is similarly K, an output $V_{MIX02}$ of the multiplier 4 is represented by the following equation.

$$V_{MIX02} = K \cdot \{V_i \cdot \cos(\omega_C - \omega_{Si})t + V_S \cdot \cos(\omega_C + \omega_{SS})t\} \cdot V_C \cdot \{-\sin(\omega_C + \omega_{Af})t\}$$

Furthermore, an output $V_{LPF02}$ of the low pass filter 8 after the double wave is removed from the output of the multiplier 4 is represented by the following equation.

$$V_{LPF02} = \{-(K \cdot V_i \cdot V_C)/2\} \cdot \sin(\omega_{Si} + \omega_{Af})t + \{(K \cdot V_S \cdot V_C)/2\} \cdot \sin(\omega_{SS} - \omega_{Af})t$$

Moreover, inside the digital signal processing section 20, with respect to the signal shown in FIG. 3(b), first the image signal is removed by the image rejection processing section 21 to reject the signal of an unnecessary channel. Furthermore, with respect to the remaining signal, the frequency is converted at the frequency LO2 in the complex frequency converter 22. Additionally, the rate conversion, processing section 23 carries out ½ decimations processing (sampling frequency drop: fs/2) to convert the signal to a signal shown in FIG. 3(c).

Here, the carrier wave frequency LO2 in the complex frequency converter 22 is assumed to be ¼ of the sampling frequency fs in the AD converters 9, 10.

Moreover, the decimation processing is of a typical type for lowering the sampling frequency by the decimation-in-time processing to convert the rate.

Subsequently, further with respect to the signal shown in FIG. 3(c), the image signal is removed by the image rejection processing section 24 to reject the signal of the unnecessary channel. Furthermore, with respect to the remaining signal, the frequency is converted at the frequency LO3 in the complex frequency converter 25. Additionally, the rate conversion processing section 26 carries out the ½ decimation (sampling frequency drop: fs/4) to convert the signal to a signal shown in FIG. 3(d).

Here, the carrier wave frequency LO3 in the complex frequency converter 25 is assumed to be ⅛ of the sampling frequency fs in the AD converters 9, 10.

Subsequently, further with respect to the signal shown in FIG. 3(d), the band filters 27a, 27b limit the band; for channel selection to extract a desired signal (desired wave). Furthermore, the complex frequency converter 28 converts the frequency at the frequency LO4 by the offset frequency to obtain a base band signal, and the demodulation processing section 29 carries out demodulation processing to output a demodulated signal.

The operation in the digital signal processing section 20, particularly the processing of the channel selection filter (band limiting filter), which has heretofore been carried out at the sampling frequency fs in the AD converters 9 and 10 by decimation processing in the rate conversion processing section 26 can be carried out at the frequency which is ¼ of the sampling frequency fs in the band filters 27a, 27b of the present invention. The processing can efficiently be carried out.

Moreover, the image rejection processing is multi-staged, but the sampling frequency is lowered to carry out the processing. Therefore, a processing load does not increase in the image rejection processing.

It is to be noted that FIG. 2 shows the configuration example including two stages of the combinations of the image rejection processing, frequency conversion processing, and rate conversion processing. The number of stages of combinations is not limited in the present invention.

Figure 4:
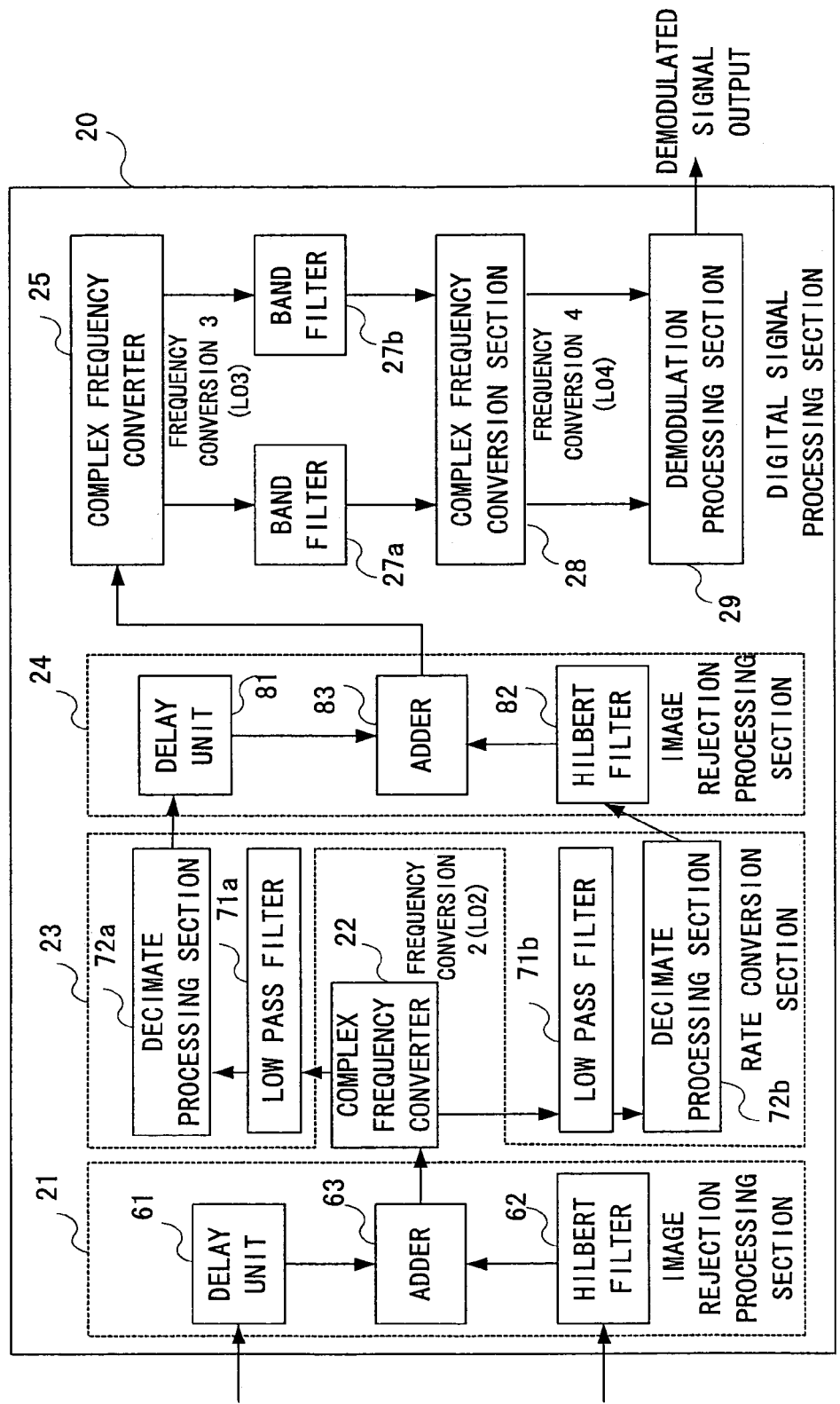
FIG. 4 is a block diagram showing a concrete configuration example inside a digital signal processing section of the direct conversion circuit according to the first embodiment of the present invention.

Next, a concrete configuration example inside the digital signal processing section 20 of the direct conversion circuit according to the first embodiment of the present invention will be described with reference to FIG. 4. FIG. 4 is a block diagram showing the concrete configuration example inside the digital signal processing section 20 of the direct conversion circuit according to the first embodiment of the present invention. It is to be noted that FIG. 4 shows the configuration example in which the rate conversion processing section 26 of FIG. 2 is omitted.

First, the inner configuration example of the image rejection processing section 21 is constituted of a delay unit 61, HILBERT filter 62, and adder 63.

Moreover, the inner configuration example of the image rejection processing section 24 is similarly constituted of a delay unit 81, HILBERT filter 82, and adder 83. The operation of each component is the same as that of the image rejection processing section 21.

Furthermore, the inner configuration example of the rate conversion processing section 23 is constituted of a low pass filter 71a and decimate processing section 72a on the side of the in-phase component, and a low pass filter 71b and decimate processing section 72b on the side of the quadrature component.

First, each component in the image rejection processing sections 21 and 24 will be described.

The image rejection processing sections 21 and 24 remove image frequency signals generated by the frequency conversion of the previous stage.

Each component of the image rejection processing section 21 is the same as that of the image rejection processing section 24 in the configuration and operation. Therefore, the configuration inside the image rejection processing section 21 will be described.

The HILBERT filter 62 is a finite impulse response (FIR) filter which carries out HILBERT conversion processing to carry out phase shift processing for shifting the phase of the input signal by 90 degrees. It is to be noted that the concrete configuration example will be described later.

Moreover, the configuration is not limited to the HILBERT filter and another configuration may also be used as long as the phase shift processing for shifting the phase of the input digital signal by 90 degrees is carried out.

It is conformed that a large effect of an image rejection ratio of 60 dB is obtained in a simulation result using the HILBERT filter. Therefore, the use of the HILBERT filter is considered to be preferable.

The delay unit 61 delays the input signal by the delay time corresponding to a processing delay time in the HILBERT filter 62.

The adder 63 carries out addition or subtraction with respect to the quadrature component signal whose phase has been shifted by the HILBERT filter 62, by 90°, and the in-phase component signal delayed by the delay unit 61.

Next, each component in the rate conversion processing section 23 will be described.

The rate conversion processing section 23 subjects the digital signal sampled by A/D conversion processing to the decimation-in-time processing (decimate processing) to acquire the digital signal at a frequency lower than the sampling frequency, so that the rate is converted.

A concrete method for realizing the rate conversion processing section 23 is a technology known as the decimation filter, and the inner configuration is not limited in the present invention.

The known technology of the decimation filter is described in detail in Japanese Patent Application Laid-Open No. 10-209815 "Decimation Filter".

The inner configuration example of the rate conversion processing section 23 shown in FIG. 4 is one example.

The low pass filters (LPF) 71a and 71b operate with a clock at the same frequency as the sampling frequency of the input-signal, and reduce aliasing by decimation.

With respect to the in-phase and quadrature components, the decimate processing sections 72a and 72b output a signal string whose sampling frequency is lowered by the low pass filters 71a and 71b.

The complex frequency converter 25 carries out second frequency conversion at the frequency LO3.

The band filters 27a, 27b function as the channel selection filters to limit the band and extract the desired signal (desired wave).

The complex frequency converter 28 is disposed, instead of the conventional frequency conversion processing section 12, to carry out the digital signal processing for removing the offset provided at the local oscillator 5' by the receiver conversion to output the in-phase and quadrature component signals.

The demodulation processing section 29 performs the demodulation processing in the same manner as the conventional base band demodulation section 11.

Next, a concrete operation in the concrete configuration example of the digital signal processing section 20 shown in FIG. 4 will be described based on the operation principle.

Inside the digital signal processing section 20, the digital signal from the AD converter 9 is delayed by the delay unit 61, the digital signal from the AD converter 10 is HILBERT converted by the HILBERT filter 62, and both the signals are added by the adder 63 to reject the image signal.

The output $V_{LPF02}$ of the low pass filter 8 is converted to the digital signal from the analog signal by the AD converter 10, and a signal $V_{HIL0}$, HILBERT-converted by the HILBERT filter 62 is represented by the following equation.

$$V_{HIL0} = \{-(K \cdot V_i \cdot V_c)/2\} \cdot \cos(\omega_{Si} + \omega_{\Delta f})t + \{(K \cdot V_s \cdot V_c)/2\} \cdot \cos(\omega_{\Delta f} - \omega_{SS})t$$

Moreover, an output $V_{ADD}$ of the adder 63 is represented by the following equation.

$$V_{ADD} = V_{LPRF0I} + V_{HIL0}$$
$$= \{(K \cdot V_i \cdot V_c)/2\} \cdot \cos(\omega_{Si} + \omega_{\Delta f})t +$$
$$\{(K \cdot V_s \cdot V_c)/2\} \cdot \cos(\omega_{\Delta f} - \omega_{ss})t +$$
$$\{-(K \cdot V_i \cdot V_c)/2\} \cdot \cos(\omega_{si} + \omega_{\Delta f})t +$$
$$\{(K \cdot V_s \cdot V_c)/2\} \cdot \cos(\omega_{\Delta f} - \omega_{ss})t$$
$$= (K \cdot V_s \cdot V_c) \cdot \cos(\omega_{ss} - \omega_{\Delta f})t$$

It is to be noted that when a relation between the image signal ($\omega_{si}$), and received desired wave signal ($\omega_{ss}$) is reversed, the adder 63 is replaced with subtraction, and the image signal can similarly be rejected.

$$V_{ADD(SUB)} = V_{LPRF0I} - V_{HIL0}$$
$$= \{(K \cdot V_i \cdot V_c)/2\} \cdot \cos(\omega_{Si} + \omega_{\Delta f})t +$$
$$\{(K \cdot V_s \cdot V_c)/2\} \cdot \cos(\omega_{\Delta f} - \omega_{ss})t -$$
$$\{-(K \cdot V_i \cdot V_c)/2\} \cdot \cos(\omega_{si} + \omega_{\Delta f})t -$$
$$\{(K \cdot V_s \cdot V_c)/2\} \cdot \cos(\omega_{\Delta f} - \omega_{ss})t$$
$$= (K \cdot V_i \cdot V_c) \cdot \cos(\omega_{si} - \omega_{\Delta f})t$$

In the above equation, the image signal ($\omega_{Si}$) is extracted. However, since the symbol of an initially defined variable is as such, the received desired wave signal can be extracted assuming that the relation between the image signal ($\omega_{Si}$) and the received desired wave signal ($\omega_{SS}$) is reversed.

Subsequently, the output signal of the adder 63 from which the image signal has been rejected is repeatedly subjected to the frequency conversion, rate conversion, and image rejection via the complex frequency converters 22 to 25, finally filtered by the band filters 27a, 27b to extract the desired signal, converted by the offset frequency Δf by the complex frequency converter 28 to obtain the in-phase and quadrature outputs necessary for the demodulation processing, and subjected to the demodulation processing by the demodulation processing section 29.

The output $V_{ADD}$ of the adder 63 described above in the equation is filtered by the band filters 27a, 27b, and an output $V_{BPF}$ converted by the offset frequency Δf by the demodulation processing section 29 is represented by the following equation in complex numeral.

$$V_{BPF} = (K \cdot V_s \cdot V_c) \cdot e^{j(\omega_{ss} - \omega_{\Delta f})t} \cdot e^{j(\omega_{\Delta f})t}$$
$$= (K \cdot V_s \cdot V_c) \cdot e^{j(\omega_{ss})t}$$

Accordingly, the targeted desired wave signal can be demodulated.

Figure 5:
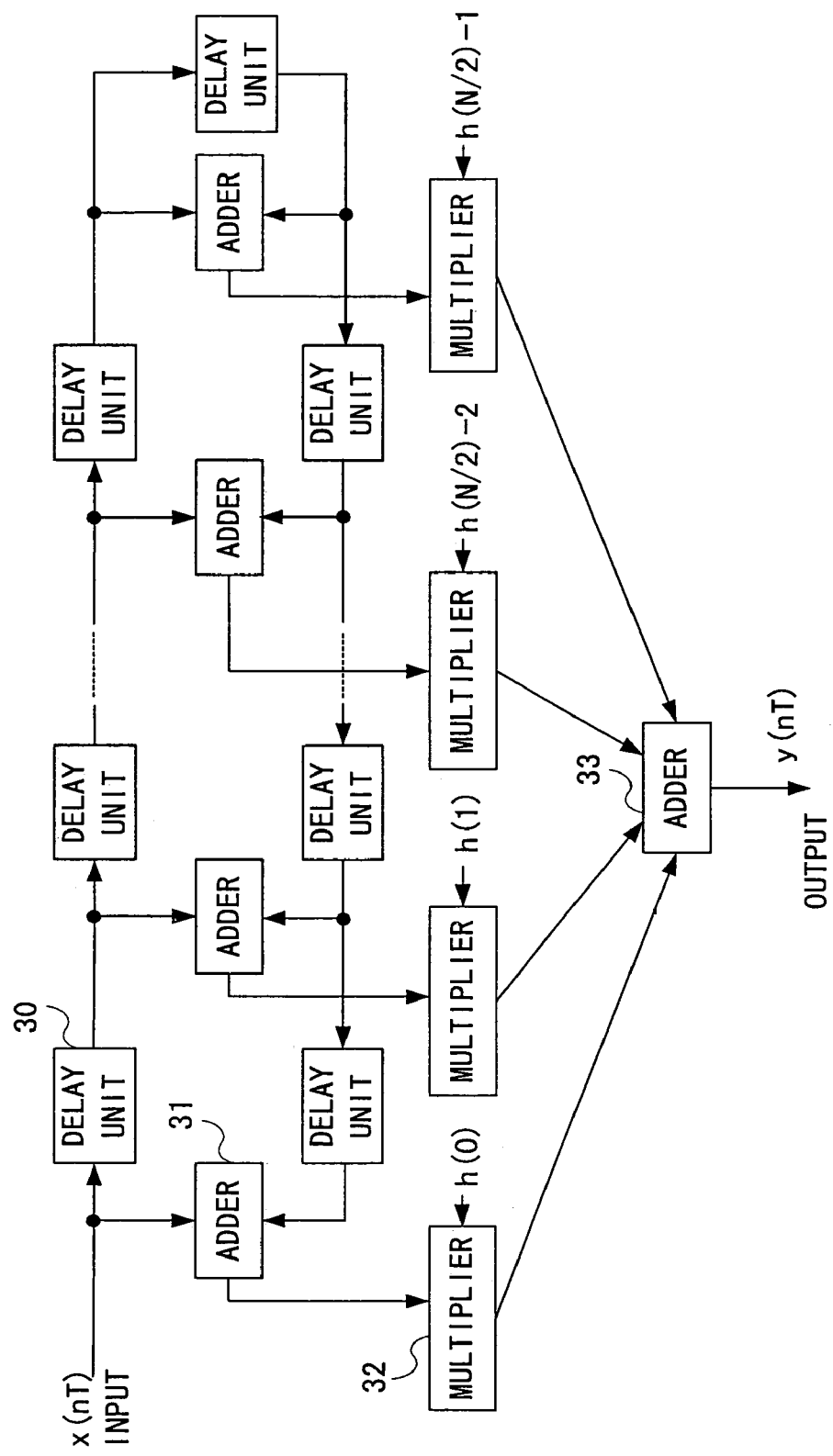
FIG. 5 is a block diagram showing a concrete configuration example of a HILBERT filter in the direct conversion circuit of the present invention.

Next, the concrete configuration example of the HILBERT filter 62 of the present invention will be described with reference to FIG. 5. FIG. 5 is a block diagram showing the concrete configuration example of the HILBERT filter 62 in the direct conversion circuit of the present invention.

The HILBERT conversion processing is 90-degrees phase shift processing in which frequency characteristics can be represented by the following equation.

$$H(j\omega) = e^{-j\pi/2} = -j \quad (0 \leq \omega \leq \pi)$$
$$+j \quad (\pi \leq \omega \leq 2\pi)$$

Then, H(jω) is subjected to inverse Fourier conversion to obtain a filter coefficient $h_k$ as represented in the following equation. Additionally, $-\infty < k < \infty$.

$$h_k = 0 \quad (k: \text{even number})$$
$$2/(k\pi) \quad (k: \text{odd number})$$

In actual, in the HILBERT filter 62 which realizes the HILBERT conversion processing, a configuration and operation are implemented in which a tap length of the filter is limited to a finite length and a window function is multiplied by a transmission function.

That is, for the concrete configuration example of the HILBERT filter 62 of the present invention, as shown in FIG. 5, the odd number of delay units 30 are successively connected, and divided into front-stage and rear-stage groups symmetrically centering on the central delay unit 30. A plurality of adders 31 for subtraction with respect to the input signals of the delay units 30 in the front-stage group and the output signals of the delay units in the rear-stage group in a symmetric relation, and an adder 31 for the subtraction with respect to the input and output signals of the central delay unit are disposed to carry out the subtraction. A subtraction result is multiplied by a HILBERT coefficient by a multiplier 32, and multiplication results are added by an adder 33.

By the above-described configuration, the HILBERT filter 62 is odd-number symmetrical centering on an origin (central delay unit 30). Therefore, the subtraction result of the input/output of the delay units 30 in the symmetric relation is multiplied by the filter coefficient, and added. Accordingly, the number of multipliers 32 can be ½ of that of delay units 30, and the constituting load of the hardware can remarkably be reduced.

Furthermore, as described above in the equation, when k is the even number, the filter coefficient $h_k$ is 0. Therefore, when the multiplication is not carried out, the number of multiplications in the multiplier 323 can further be halved, and it is possible to remarkably reduce the load of the processing.

Figure 6:
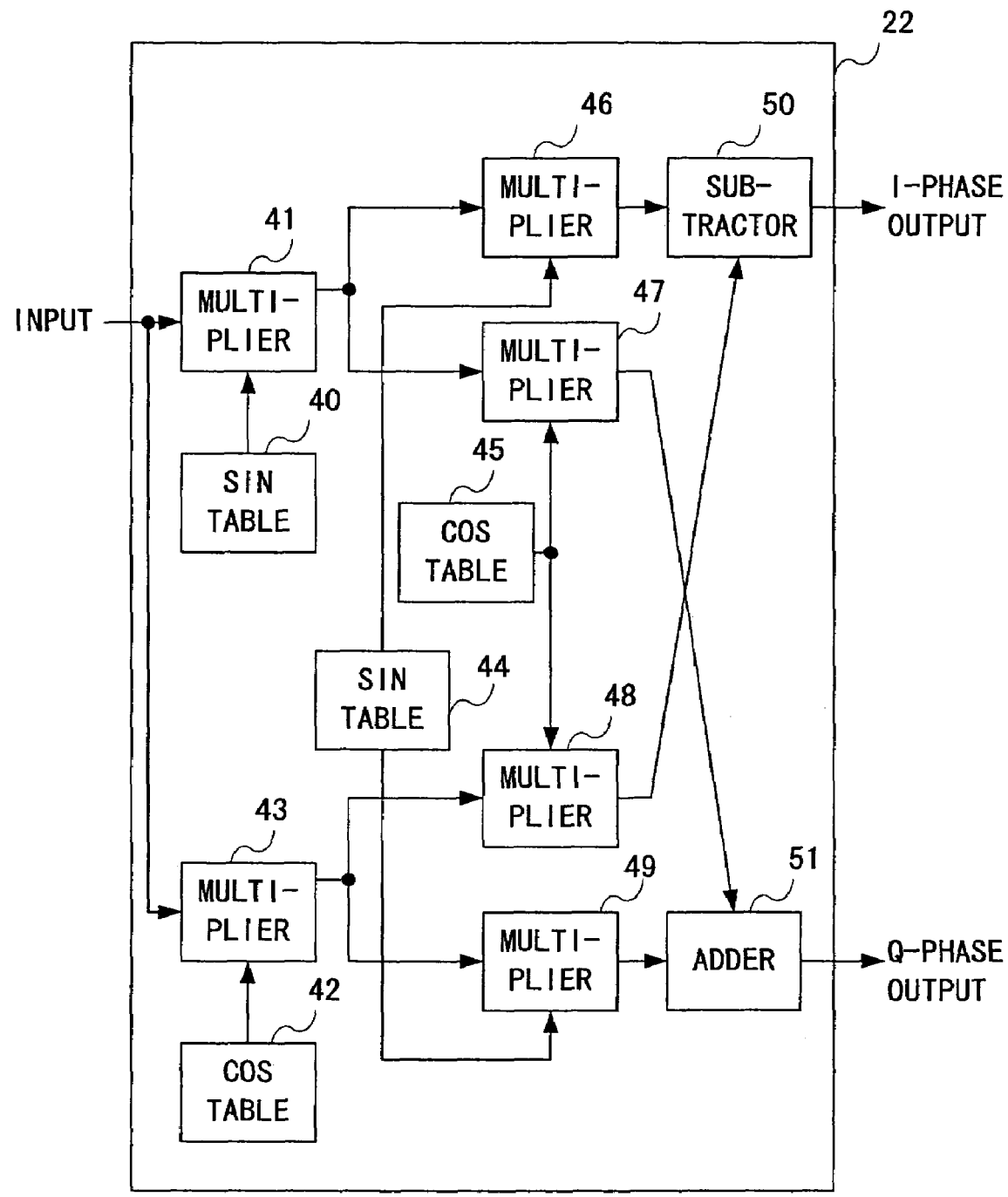
FIG. 6 is a block diagram showing a concrete configuration example of complex frequency converters 22, 25 in the direct conversion circuit of the present invention.

Next, the concrete configuration example of the complex frequency converters 22, 25 of the present invention will be described with reference to FIG. 6. FIG. 6 is a block diagram showing the concrete configuration example of the complex frequency converters 22, 25 in the direct conversion circuit of the present invention.

For the concrete configuration example of the complex frequency converters 22, 25 in the direct conversion circuit of the present invention, as shown in FIG. 6, there are disposed: an SIN table 40 and COS table 42 preset in accordance with the frequency to be subjected to the frequency conversion (e.g., LO2 for the complex frequency converter 22, LO3 for the complex frequency converter 25); a multiplier 41 which multiplies the input signal by the value of the SIN table 40 to output the in-phase component; and a multiplier 43 which multiplies the input signal by the value of the COS table 42 to output the quadrature component.

Furthermore, there are disposed: an SIN table 44 and COS table 45 preset to finely adjust the frequency converted by the above-described configuration; multipliers 46, 47 which multiply an in-phase component output from the multiplier 41 by values of the SIN table 44 and COS table 45, respectively; multipliers 49, 48 which multiply a quadrature component output from the multiplier 43 by the values of the SIN table 44 and COS table. 45, respectively; a subtractor 50 which performs subtraction with respect to the outputs of the multipliers 46 and 48; and an adder 51 which adds up the outputs of the multipliers 47 and 49.

Here, the complex frequency converters 22, 25 correspond to a third frequency conversion section as claimed, the inner configuration including the SIN table 40 and COS table 42 correspond to a first SIN table and first COS table, and the SIN table 44 and COS table 45 correspond to a second SIN table and second COS table.

In the operations, of the complex frequency converters 22, 25 in the direct conversion circuit of the present invention, the image-rejected signal outputted from the previous-stage image rejection processing section is inputted into the multipliers 41 and multiplier 43, multiplied by the values of the SIN table 40 and COS table 42, and subjected to the frequency conversion at the conversion frequency LO2 or LO3 to output the in-phase and quadrature components.

The outputs of the multipliers 41 and 43 are inputted into the multipliers 46, 47, 48, 49, multiplied by the values of the SIN table 44 and COS table 45, and frequency-converted for micro frequency adjustment by the processing of the subtractor 50 and adder 51.

It is to be noted that the double wave is removed from and after the outputs of the multipliers 46 and 47, and frequency precision can be secured. In this case, without disposing the configuration including the SIN table 44 to the adder 51, the outputs of the multipliers 41 and 43 can be the in-phase and quadrature outputs.

Figure 7:
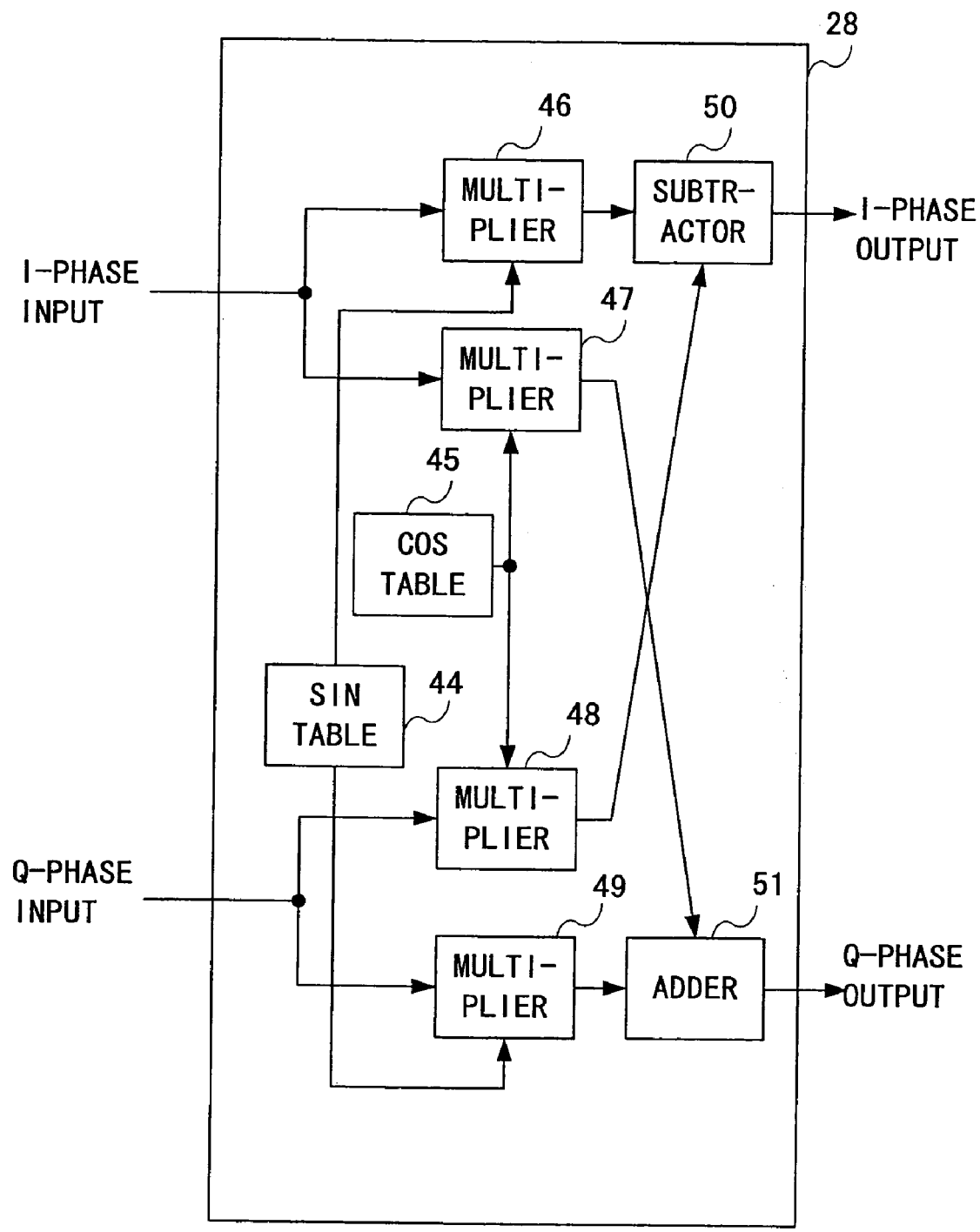
FIG. 7 is a block diagram showing a concrete configuration example of a complex frequency converter 28 in the direct-conversion circuit of the present invention.

Next, the concrete configuration example of the complex frequency converter 28 of the present invention will be described with reference to FIG. 7. FIG. 7 is a block diagram showing the concrete configuration example of the complex frequency converter 28 in the direct conversion circuit of the present invention.

In the concrete configuration example of the complex frequency converter 28 in the direct conversion circuit of the present invention, as shown in FIG. 7, there are disposed: the SIN table 44 and COS table 45 preset to remove the offset provided at the local oscillator 5 (e.g., LO4); the multipliers 46, 47 which multiply the in-phase component input (i-phase input) by the values of the SIN table 44 and COS table 45, respectively; the multipliers 49, 48 which multiply the quadrature component input (Q-phase input) by the values of the SIN table 44 and COS table 45, respectively; the subtractor 50 which performs the subtraction with respect to the outputs of the multipliers 46 and 48; and the adder 51 which adds up the outputs of the multipliers 47 and 49.

The configuration of the complex frequency converter 28 shown in FIG. 7 is basically the same as that of the complex frequency converters 22, 25 shown in FIG. 6, but is different in that the input signals are already the in-phase (I) signal and quadrature (Q) signal.

Moreover, the values preset in the SIN table 44 and COS table 45 are used in the frequency conversion for removing the offset Δf provided at the local oscillator 5. The offset is finally removed by the operation of the complex frequency converter 28, and the desired wave signal is extracted and outputted to the demodulation processing section 29.

It is to be noted that in general with the increase of a carrier frequency, the processing load increases in the multiplication processing of the carrier wave. Therefore, a multiplication processing portion of the carrier wave is preferably constituted using a field programmable gate array (FPGA), and another portion is preferably constituted using a digital signal processor (DSP).

Moreover, when the direct conversion circuit of the, present invention is realized using the DSP, the multipliers, adder, and, subtractor may also be realized by the software.

It is to be noted that in FIGS. 2, 4, after the band is limited (channel is selected) by the band filters 27a, 27b, the complex frequency converter 28 converts the frequency of the offset, but this order of the frequency conversion and channel selection may also be reversed.

Furthermore, FIG. 2 shows a configuration in which the image rejection processing section, complex frequency converter, and rate conversion processing section are combined in one set and two sets are continuously disposed. However, the three components do not have to be necessarily combined in one set. As shown in FIG. 4, the rate conversion processing section in the second stage may also be omitted.

According to the low-IF type direct conversion circuit according to the first embodiment of the present invention, after the image rejection is carried out by the image rejection processing section 21 by the digital signal processing in the digital signal processing section 20, the complex frequency converter 22 converts the frequency to reduce the frequency. Furthermore, after the rate conversion processing section 23 lowers the sampling frequency, the band filters 27a, 27b limit the band of data of the low sampling frequency for the channel selection to extract the desired signal (desired wave). Therefore, hardware addition of the band filters 27a, 27b is reduced, and further the addition of the processing can also effectively be reduced.

Moreover, further following the first stage, the image rejection processing section 24, complex frequency converter 25, and rate conversion processing section 26 are disposed. Then, the sampling frequency is further lowered, and the band filters 27a, 27b limit the band with respect to the data of the sampling frequency for the channel selection to extract, the desired signal (desired wave). Therefore, the hardware addition of the band filters 27a, 27b is further reduced, and further the addition of the processing can also effectively be reduced.

Furthermore, in the direct conversion circuit of the present invention, the image rejection processing is multistaged, but the sampling frequency is lowered to carry out the processing. Therefore, the processing load does not increase in the image rejection processing, and the image rejection ratio can effectively be improved.

According to the low-IF type direct conversion circuit of the first embodiment of the present invention, with respect to the signal of the image frequency generated at the time of the multiplication of the local oscillations frequency on a transmission side, the image rejection is carried out by the digital signal processing in the digital signal processing section 20. In the conventional art, since the analog processing is carried out, the image rejection ratio is not sufficient, and the limit of the ratio has heretofore been about 40 dB. On the other hand, the digital signal processing has an effect that the image rejection ratio can be improved to about 60 dB.

Moreover, since the image rejection is carried out by the digital signal processing, the load of the hardware is small, and the processing load can also effectively be reduced.

In the concrete configuration for the image rejection, with respect to the digital signal including the in-phase and quadrature component signals multiplied by the output of the local oscillator 5', the phase of the quadrature component signal is shifted by 90° by the HILBERT filter 62, and the in-phase component is delayed by the delay unit 61. Subsequently, the addition (subtraction) is carried out by the adder 63 to reject the image signal. Therefore, the image rejection can effectively be realized with the simple configuration.

Moreover, in the configuration inside the HILBERT filter 62 for realizing the image rejection, the odd number of delay units 30 are successively connected, and divided into the front-stage and, rear-stage groups symmetrically centering on the central delay unit 30. There are disposed: a plurality of adders 31 for the addition or subtraction with respect to the input signals of the delay units of the front-stage group of the delay units 30 and the output signals of the delay units of the rear-stage group in the symmetric relation; and the adder 31 for the addition or subtraction with respect to the input and output signals of the central delay unit to carry out the addition or subtraction. The addition or subtraction result is multiplied by the HILBERT coefficient by the multiplier 32, and multiplication results are added by the adder 33. Therefore, the input/output of the delay unit 30 in the symmetric relation is subjected to the addition or subtraction, and multiplied by the filter coefficient. When the results are added, the number of multipliers 32 can be ½ of that of delay units 30, and there is an effect that the constituting load of the hardware can remarkably be reduced.

Furthermore, as the characteristics of the filter coefficient in the HILBERT filter 62, the even-numbered coefficient is zero (0). Therefore, it is assumed that the multiplication is not performed. Then, there is an effect that the number of multiplications is further halved and the load of the processing can remarkably be reduced.

According to the direct conversion-circuit of the first embodiment of the present invention, in the complex frequency converters 22, 25, the SIN table 40 and COS table 42 predetermined so as to perform the frequency conversion processing are used to multiply the input signal by the value of the SIN table 40 by the multiplier 41 so that the in-phase component signal is outputted. Moreover, the multiplier 43 multiplies the input signal by the value of the COS table 42 to output the quadrature component signal. Therefore, the frequency can effectively be with the simple configuration/processing.

Moreover, in the complex frequency converters 22, 25, the SIN table 44 and COS table 45 predetermined so as to perform the frequency conversion processing at a micro frequency are used to multiply the in-phase component signal from the multiplier 41 by the value of the SIN table 44 by the multiplier 46. Moreover, the multiplier 47 multiplies the in-phase component signal from the multiplier 41 by the value of the COS table 45, the multiplier 48 multiplies the quadrature component signal from the multiplier 43 by the value of the COS table 45, and the multiplier 49 multiplies the quadrature component signal from the multiplier 43 by the value of the SIN table 44. The outputs from the multipliers 46 and 48 are subjected to the subtraction by the subtractor 50, and the outputs from the multipliers 48 and 49 are added by the adder 51. Therefore, the micro adjustment of the frequency can effectively be carried out with good precision.

According to the direct conversion circuit of the present invention, in the complex frequency converter 28, the SIN table 44 and COS table 45 predetermined so as to perform the frequency conversion processing for removing the offset provided at the-local oscillator 5' are used to multiply the in-phase component signal from the multiplier 41 by the value of the SIN table 44 by the multiplier 46. Moreover, the multiplier 47 multiplies the in-phase component signal from the multiplier 41 by the value of the COS table 45, the multiplier 48 multiplies the quadrature component signal from the multiplier 43 by the value of the COS table 45, and the multiplier 49 multiplies the quadrature component signal from the multiplier 43 by the value of the SIN table 44. The outputs from the multipliers 46 and 48 are subjected to the subtraction by the subtractor 50, and the outputs from the multipliers 48 and 49 are added by, the adder 51. Therefore, there is an effect that the frequency offset can precisely be removed with the simple configuration/processing.

When the direct conversion circuit according to the first embodiment of the present invention is used in the receiver, the receiver can effectively be constituted so as to improve the image rejection ratio and to further reduce the hardware configuration and the processing load.

Next, the receiver including, the direct conversion circuit according to a second embodiment of the present invention will be described.

For the receiver including the direct conversion circuit according to the second embodiment of the present invention, the local oscillator for oscillating the carrier wave at the frequency including the reception frequency and offset is used to receive the digital signals of the in-phase component and quadrature component which are detected in the quadrature manner. By the digital signal processing, a phase deviation correction processing section detects and corrects a phase deviation from the inputted digital signal including the in-phase and quadrature components. After an amplitude deviation correction processing section detects and corrects an amplitude deviation, the image rejection section rejects the image frequency signal included in the received signal. Therefore, while the loads of the hardware and processing are reduced, the phase and amplitude deviations caused by the analog device are corrected, and the image rejection ratio can be enhanced.

The principle configuration of the direct conversion circuit according to the second embodiment of the present invention is shown in FIG. 1 in the same manner as in the first embodiment. For the received signal inputted via the aerial wire, the signal of a desired frequency band is extracted in accordance with the required band or attenuation level by the band pass filter (BPF) 1. The signal is linearly amplified at a predetermined amplification factor necessary for the receiver by the (low noise) amplifier 2.

Moreover, the received signal amplified by the amplifier 2 is multiplied (frequency-converted) by the carrier wave at the frequency including the reception frequency from the local oscillator 5' and a given offset frequency in the multiplier (mixer) 3 to output the in-phase component. Furthermore, the signal is multiplied (frequency-converted) by the carrier wave obtained by shifting the phase of the carrier wave from the local oscillator 5' by 90° by the 90° phase shifter 6 in the multiplier (mixer) 4 to output the quadrature component.

Subsequently, for the in-phase and quadrature components, the signal of the frequency component obtained by adding the received signal frequency and local oscillation frequency is removed by the low pass filters 7, 8, the analog signal is converted to the digital signal by the AD converters 9, 10, and the in-phase and quadrature outputs of the digital signal are obtained.

Here, prior to description of details of the characteristic part of the second embodiment of the present invention, the operation principle of a method for rejecting the image signal by the complex frequency conversion, which is one of methods for rejecting the image signal by the digital signal processing, will be described.

The operation principle of the receiver shown in FIG. 1 will be described. A desired frequency, signal $V_d(t)$ and image frequency signal $V_u(t)$ are inputted as the received signal into the band pass filter (BPF) 1 via the aerial wire. This BPF prevents the receiver from being saturated by the input of an intense signal, which is different from a selection function of the receiver. It is to be noted that the desired frequency signal and image frequency signal are assumed as the carrier wave signals, but the same applies to a general modulated wave signal.

In FIG. 1, assuming that:
the desired frequency signal is $V_d(t)=2\cos(\omega_d t)=\exp\{j(\omega_d t)\}+\exp\{-j(\omega_d t)\};$ the image frequency signal is $V_u(t)=2\cos(\omega_u t)=\exp\{j(\omega_u t)\}+\exp\{-j(\omega_u t)\};$ the local oscillation frequency signal is $V_L(t)=2\cos(\omega_L t)=\exp\{j(\omega_L t)\}+\exp\{-j(\omega_L t)\};$ $\omega_d-\omega_L=\omega_i$ (intermediate frequency in low IF); and
$\omega_L-\omega_u=\omega_i$ (intermediate frequency in low IF), the outputs of the multipliers (mixers) 3 and 4 are represented by the following equation in a complex numeral display.

$$[\exp\{j(\omega_d t)\}+\exp\{-j(\omega_d t)\}+\exp\{j(\omega_u t)\}+\exp\{-j(\omega_u t)\}][\exp\{-j(\omega_L t)\}] =$$
$$\exp\{j(\omega_d-\omega_L)t\}+\exp\{-j(\omega_d+\omega_L)t\}+$$
$$\exp\{j(\omega_u-\omega_L)t\}+\exp\{-j(\omega_u+\omega_L)t\} =$$
$$\exp\{j(\omega_i t)\}+\exp\{-j(\omega_d+\omega_L)t\}+\exp\{-j(\omega_i t)\}+\exp\{-j(\omega_u+\omega_L)t\}$$

Subsequently, the components $(\omega_d+\omega_L)$ and $(\omega_u+\omega_L)$ are removed by the LPFs 7 and 8 behind the multipliers (mixers) 3 and 4, and the following equation results.

$\exp\{j(\omega_i t)\}+\exp\{-j(\omega_i t)\}$

Subsequently, the analog signal is converted to the digital signal by the AD converters 9 and 10 behind the LPFs, 7 and 8, and inputted into a digital signal processing section 20'.

In the digital signal processing section 20', with the method for rejecting the image signal by the complex frequency conversion, the following equation results by the complex frequency conversion corresponding to the image rejection.

$[\exp\{j(\omega_i t)\}+\exp\{-j(\omega_i t)\}][\exp\{-j(\omega_i t)\}]=$base band signal+$[\exp\{-j(2\omega_i t)\}]$ A desired base band signal is obtained by the LPF, and the like after the complex frequency conversion.

However, in the above equation, with respect to the in-phase component into the AD converter 9 from the multiplier (mixer) 3, and the quadrature component into the AD converter 10 from the multiplier (mixer) 4, the amplitude deviation between systems caused by the analog multiplier, and the phase deviation between in-phase and quadrature systems caused mainly by the phase error of the 90° phase shifter 6 exist. In actual, this depends on devices (multipliers 3, 4 and 90° phase shifter 6) of the analog processing for use.

In FIG. 1, assuming that a gain of the multiplier (mixer) 3 is $A_1$, a gain of the multiplier (mixer) 4 is $A_2$, an input signal via the aerial wire with $A_2/A_1=g$ is $x(t)=\cos(\omega_c t+\theta)$ and an output from the local oscillator 5' is $\cos(\omega_c' t)$ ($\omega_c' t=2\pi f_c' t$), the outputs passed through the LPFs 7 and 8 are as follows.

$$y(t) = x(t)[\cos(\omega_c' t) - jg\sin(\omega_c' t = \Delta\phi)]$$
$$= \cos(\omega_c t + \theta)[\cos(\omega_c' t) - jg\sin(\omega_c' t + \Delta\phi)]$$
$$= (1/2)[\exp\{j(\omega_c' - \omega_c)t - \theta\}(1/2)[1 - g\exp\{j\Delta\phi\}] +$$
$$(1/2)[\exp\{j(\omega_c - \omega_c')t + \theta\}(1/2)[1 + g\exp\{-j\Delta\phi\}]$$

Here, assuming that $f_c$: desired wave signal frequency, $f_u$: image wave signal frequency, the following results.

$f_c-f_c'=f_c'-f_u=\Delta f$

A first term of the above equation indicates a signal component generated as the image signal, and a second term indicates a signal component generated as the desired wave.

Assuming that the image frequency signal component in FIG. 1 is the input signal $x(t)=\cos(\omega_U t+\theta)$ (here, $\omega_U t+\theta=2\pi f_U t$) via the aerial wire, similarly the first term indicates the signal component generated as the image signal, and the second term indicates the signal component generated as the desired wave.

Accordingly, an image rejection ratio (power) $R^2$ is:

$$R^2=[1+g^2-2g\cos(\Delta\phi)]/[1+g^2+2g\cos(\Delta\phi)]$$

In an example, in order to secure an image rejection ratio of about 60 dB or more, a deviations g of the multiplier (mixer) needs to be set to 0.01 dB, and a phase error of the 90° phase shifter needs to be about 0.05° or less.

Even with the use of the method for rejecting the image signal by the frequency conversion of the digital signal processing, which has heretofore been used in the low-IF type receiver, the multipliers (mixers) 3, 4 and 90° phase shifter 6 perform the analog processing, the image rejection is not carried out in consideration of the phase and amplitude errors generated by the analog processing.

Figure 8:
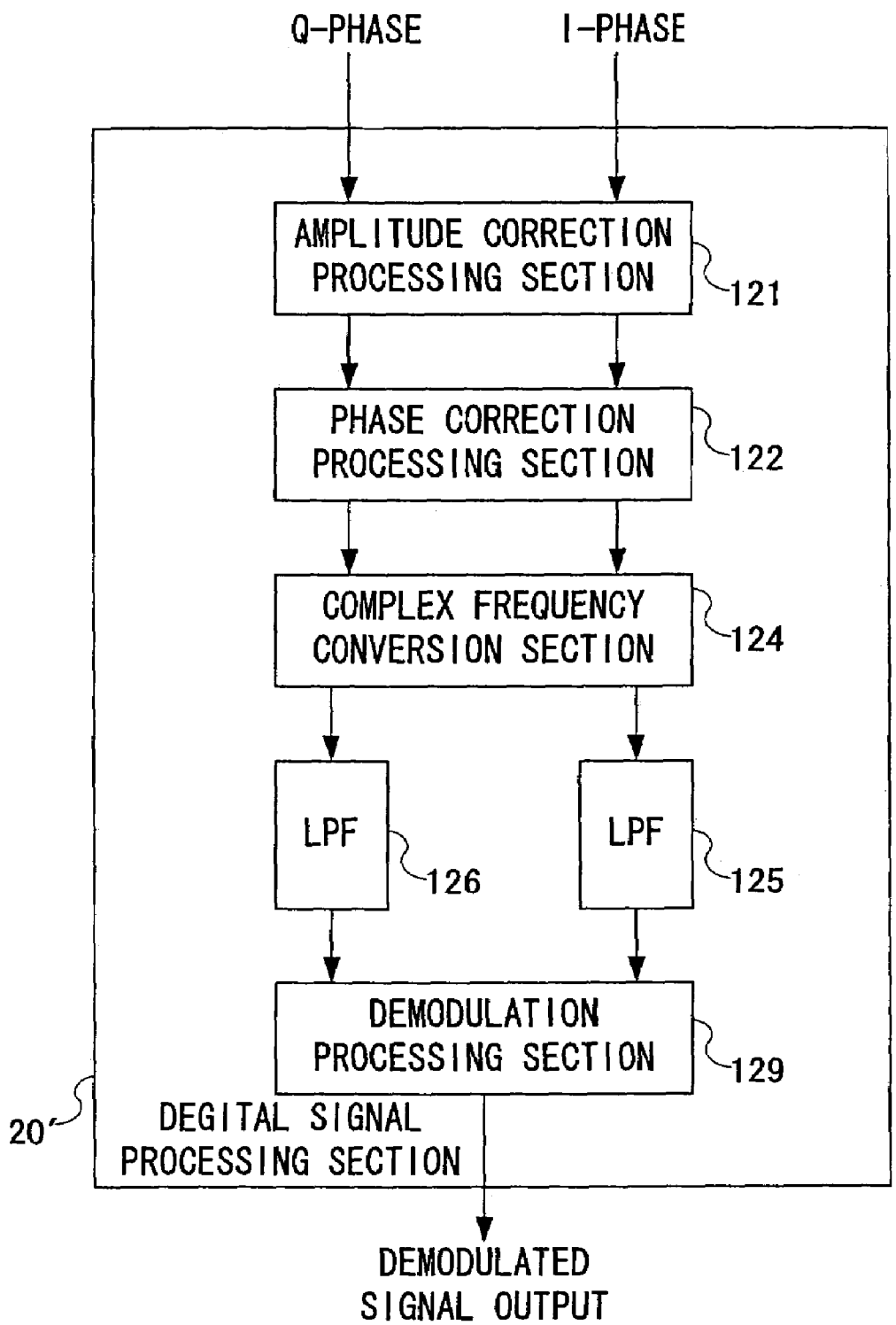
FIG. 8 is a block diagram showing a first configuration example inside the digital signal processing section in the direct conversion circuit according to a second embodiment of the present invention.

To solve the problem, the digital signal processing section 20' which is the characteristic part of the second embodiment of the present invention is constituted to perform the image rejection in consideration of even the phase and amplitude errors generated by the analog processing. This will concretely be described with reference to FIG. 8. FIG. 8 is a block diagram showing a first configuration example inside the digital signal processing section 20' in the direct conversion circuit according to the second embodiment of the present invention.

The first configuration example of the digital signal processing section 20' in the direct conversion circuit according to the second embodiment of the present invention is constituted of an amplitude correction processing section 121 which corrects the-amplitude in the analog processing; a phase correction processing section 122 which corrects the phase in the analog processing; a complex frequency conversion section 124 and low pass filters (LPF in the drawing) 125, 126 to carry out the image rejection processing and frequency conversion processing which have heretofore been performed; and finally a demodulation processing section 129 which performs the demodulation processing.

Next, the operation of the direct conversion processing in the low-IF type receiver according to the second embodiment of the present invention will be described with reference to FIGS. 1, 8.

In the low-IF type receiver of the present invention, for the received signal inputted via the aerial wire, the signals other than the signal of the frequency band for use are rejected in accordance with the required band or attenuation level by the band pass filter (BPF) 1, and the signal is linearly amplified at the predetermined amplification factor required for the receiver in the (low noise) amplifier 2.

Moreover, the received signal amplified by the (low noise) amplifier 2 is multiplied (frequency-converted) by the carrier wave at the frequency including the reception frequency from the local oscillator 5' and the offset frequency in the multiplier (mixer) 3 to output the in-phase component. Furthermore, the signal is multiplied (frequency-converted) by the carrier wave obtained by shifting the phase of the carrier wave from the local oscillator 5' by 90° by the 90° phase shifter 6 in the multiplier (mixer) 4 to output the quadrature component.

Subsequently, for the in-phase and quadrature components, the frequency components which are about twice the inputs and outputs of the local oscillator 5' are attenuated by the low-pass filters 7 and 8 (the sum of the input signal frequency and the output frequency of the local oscillator). The analog signal is converted to the digital signal by the AD converters 9 and 10 to obtain the in-phase and quadrature outputs of the digital signal.

Moreover, the in-phase and quadrature outputs of the digital signal are inputted into the digital signal processing section 20'. First, the amplitude correction processing section 121 and phase correction processing section 122 perform the correction processing of the amplitude and phase deviations between the in-phase and quadrature signals. The complex frequency conversion section 124 and low pass filters 125, 126 corresponding to the image rejection processing and frequency conversion processing reject the image signal. The signal whose central frequency includes the offset frequency is converted to a base band whose central frequency is 0. The demodulation processing section 129 performs the demodulation processing to output the demodulated signal.

The amplitude correction processing section 121 detects the amplitude deviation generated in the analog devices such as the multipliers 3 and 4 and the 90° phase shifter 6 in the front stage by the characteristics, and corrects the deviation in accordance with the detected result.

The phase correction processing section 122 detects the phase deviation generated by the analog devices such as the multipliers 3 and 4 and the 90° phase shifter 6 in the front stage by the characteristics, and corrects the deviation in accordance with the detected result.

It is to be noted that details of the amplitude correction processing section 121 and phase correction processing, section 122 will be described later.

Figure 9:
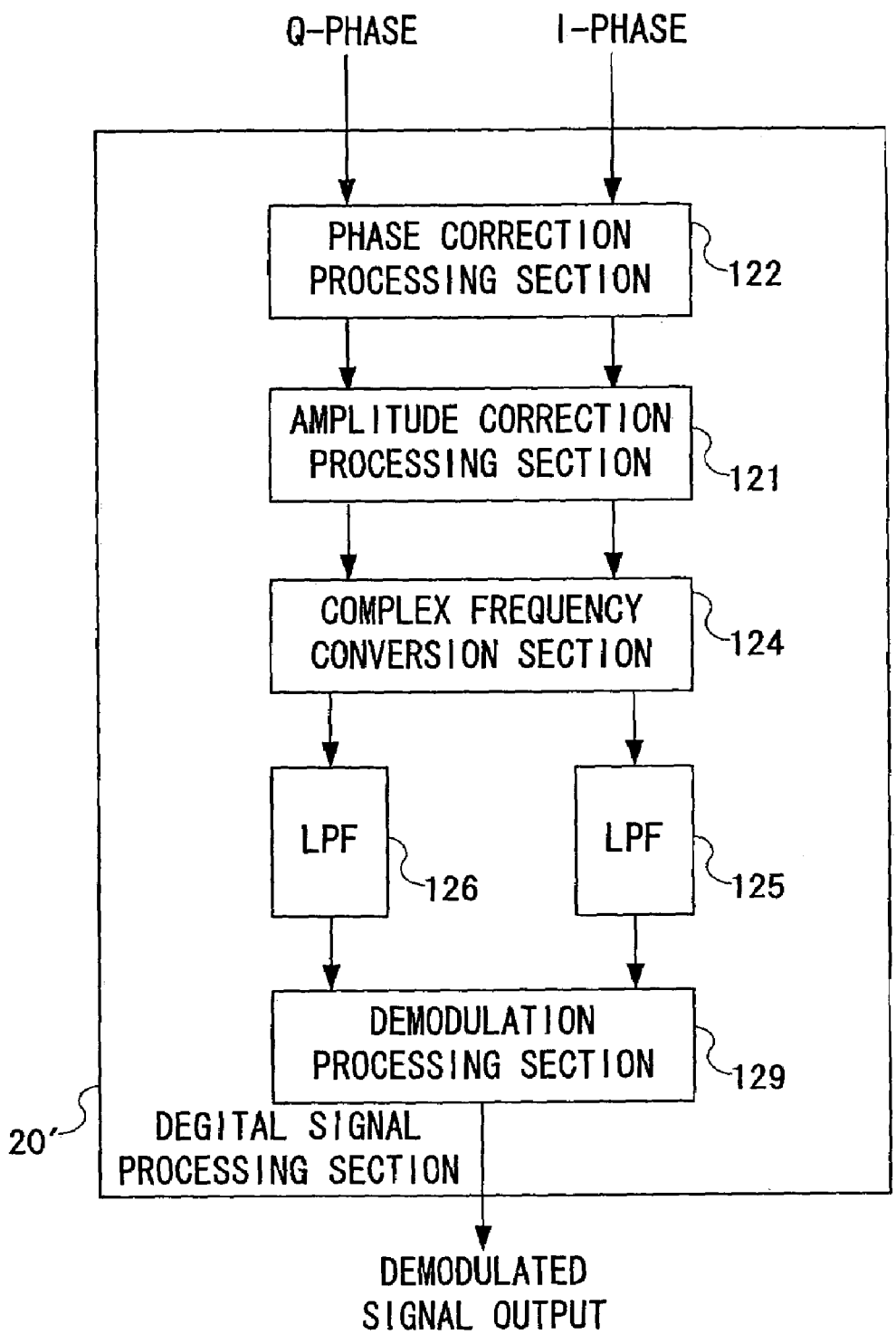
FIG. 9 is a block diagram showing a second configuration example inside the digital signal processing section in the direct conversion circuit according to the second embodiment of the present invention.

In the first configuration example shown in FIG. 8, the phase correction processing section 122 is disposed next to the amplitude correction processing section 121. However, the amplitude correction processing section 121 and phase correction processing section 122 perform the processing independently of each other. Therefore, as shown in FIG. 9, in the digital signal processing section 20', the phase correction processing section 122 is disposed to first perform the phase correction processing. Next, the amplitude correction processing section 121 may be disposed to perform the amplitude correction processing (second configuration example). FIG. 9 is a block diagram showing the second configuration example inside the digital signal processing section 20' in the direct conversion circuit according to the second embodiment of the present invention.

Moreover, only one of the amplitude correction processing section 121 and phase correction processing section 122 may also be disposed.

Figure 10:
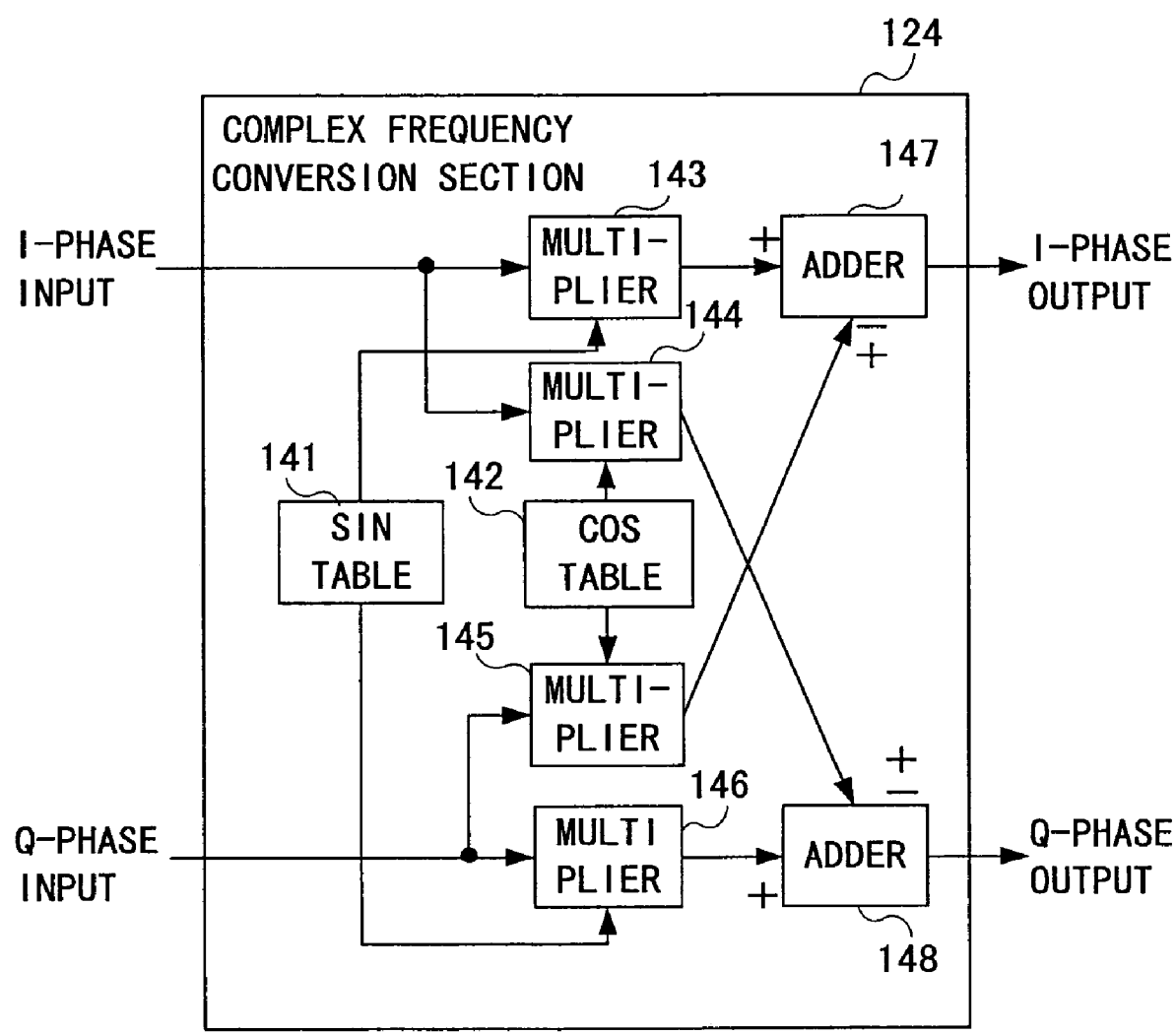
FIG. 10 is a block diagram showing an inner configuration example of a complex frequency conversion section inside the digital signal processing section of the present invention.

Here, the inner configuration example of the complex frequency conversion section 124 inside the digital signal processing section 20' of the present invention will be described with reference to FIG. 10. FIG. 10 is a block diagram showing the inner configuration example of the complex frequency conversion section 124 inside the digital signal processing section 20' of the present invention.

In the complex frequency conversion section 124 of the present invention, as shown in FIG. 10, there are disposed: an SIN table 141 and COS table 142 preset so as to remove the image; multipliers 143 and 144 for multiplying the in-phase component input (i-phase input) by the values of the SIN table 141 and COS table 142, respectively; multipliers 146 and 145 for multiplying the quadrature component input (Q-phase input) by the values of the SIN table 141 and COS table 142, respectively; an adder 147 for performing the subtraction (addition) with respect to the outputs of the multipliers 143 and 145; and an adder 148 for performing the addition (subtraction) with respect to the outputs of the multipliers 144 and 146.

In the operation of the complex frequency conversion section 124 in the direct conversion circuit of the present invention, the signals of the in-phase and quadrature components subjected to the phase and amplitude corrections and outputted from the phase correction processing section 122 and amplitude correction processing section 121 in the front stage are inputted into the multipliers 143, 144, 145, 146. The signals are multiplied by the values of the SIN table 141 and COS table 142. The frequency is converted by the processing of the adders 147 and 148 to remove the image.

Moreover, the values preset in the SIN table 141 and COS table 142 are used in the frequency conversion for removing the image. The offset is finally removed-by the operations of the subsequent low pass filters 125, 126, and the desired wave signal is extracted and outputted to the demodulation processing section 129.

It is to be noted that in general with the increases of the carrier frequency, the processing load increases in the multiplication processing of the carrier wave. Therefore, the multiplication processing portion of the carrier wave is preferably constituted using the field programmable gate array (FPGA), and the other portion is preferably constituted using the digital signal-processor (DSP).

Moreover, when the direct conversion circuit of the present invention is realized using the DSP, the multiplier, adder, and subtractor may also be realized by the software.

Figure 11:
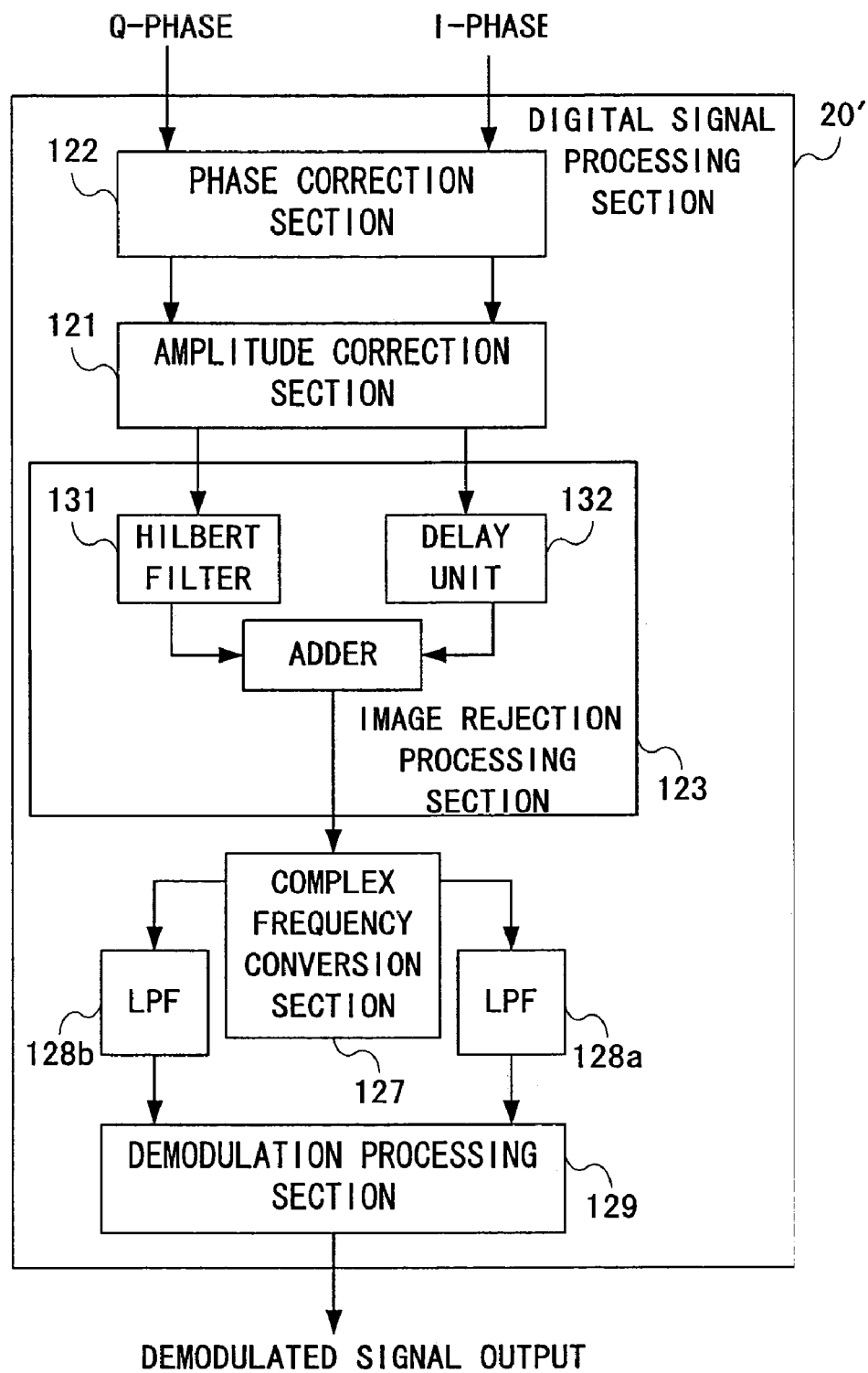
FIG. 11 is a block diagram showing a third configuration example using the HILBERT filter instead of the complex frequency conversion section of FIGS. 8, 9 with respect to a portion for performing image rejection processing.

A third configuration example in which the image rejection processing is performed by the HILBERT filter in the digital signal processing section 20' of the present invention will be described with reference to FIG. 11. FIG. 11 is a block diagram showing the third configuration example using the HILBERT filter instead of the complex frequency conversion processing section 124 of FIGS. 8, 9 with respect to the portion for performing the image rejection processing.

In the digital signal processing section 20' of the present invention, after the correction processing in the amplitude correction processing section 121, and phase correction processing section 122, an image rejection processing section 123 performs the image rejection processing. In the inner-configuration example, the image rejection processing section includes a HILBERT filter 131, delay unit 132, and adder 133.

The HILBERT filter 131 is a finite impulse response (FIR) filter for performing HILBERT conversion processing and phase shift processing to shift the phase of the input signal by 90 degrees. It is to be noted that the concrete configuration example is a known technology and therefore the description thereof is omitted.

Moreover, the configuration is not limited to the HILBERT filter and another configuration may also be used as long as the phase shift processing is performed to shift the phase of the input digital signal by 90 degrees.

In a simulation result using the HILBERT filter, it has been confirmed that an image rejection ratio of 60 dB is obtained as a large effect, and the use of the HILBERT filter is therefore considered to be preferable.

The delay unit 132 delays the input signal by the delay time corresponding to the processing delay time in the HILBERT filter 131.

The adder 133 performs the addition or subtraction with respect to the quadrature component signal whose phase has been shifted by 90° by the HILBERT filter 131 and the in-phase component signal delayed by the delay unit 132.

It is to be noted that in the digital signal processing section 20' shown in FIG. 11 the signal image-rejected and outputted from the image rejection processing section 123 is frequency-converted by a complex frequency conversion section 127. The band is limited by a low pass filter 128a or 128b, and the signal is demodulated by the demodulation processing section 129.

It is to be noted that the LPFs 128a and 128b of FIG. 11 are different from the LPFs 125, 126 of the configurations of FIGS. 8, 9 in the function and capability, and are unnecessary in principle, and can be included in the function of the demodulation processing section 129.

Figure 12:
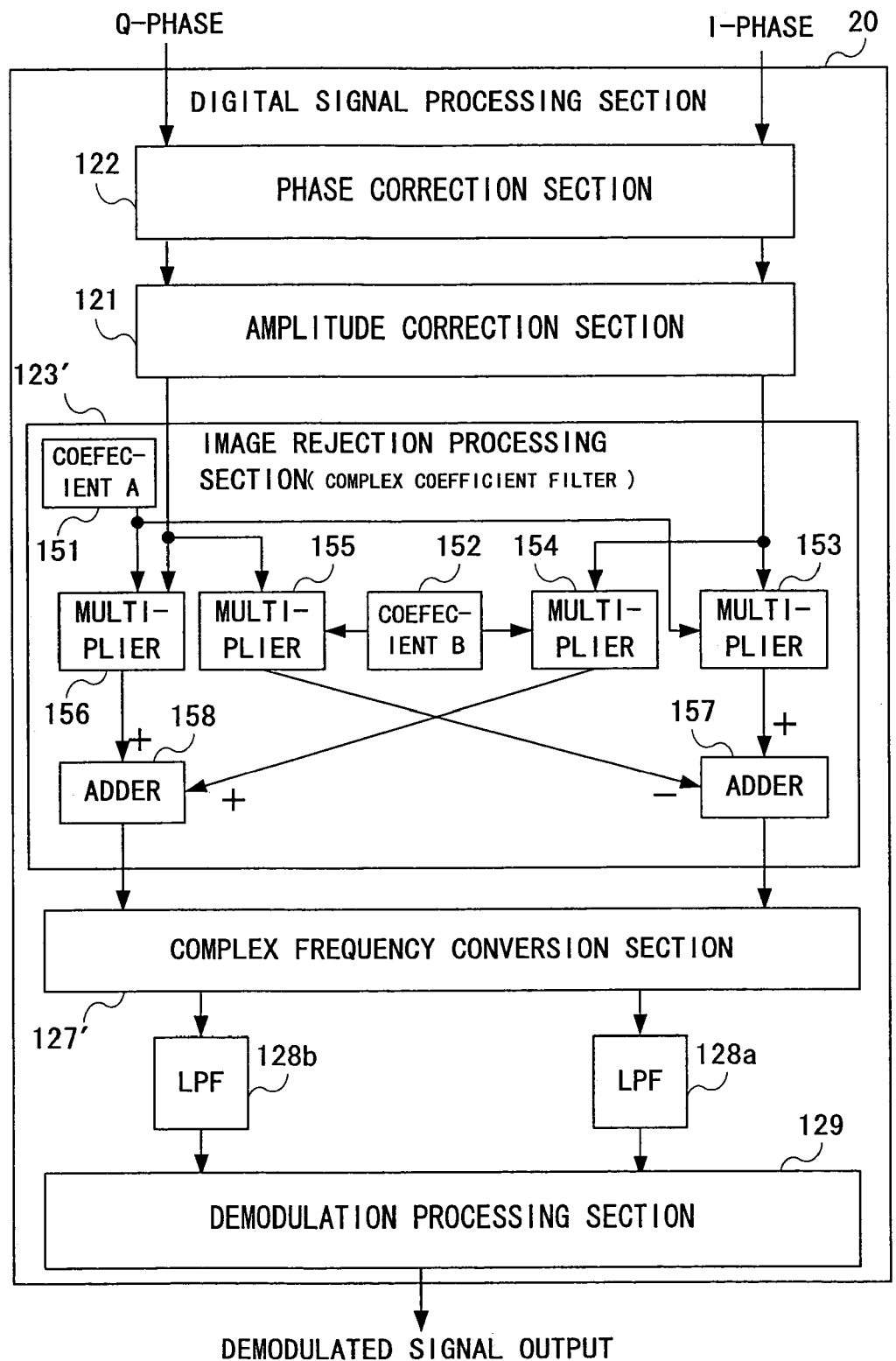
FIG. 12 is a block diagram showing a fourth configuration example using a complex coefficient filter instead of the complex frequency conversion processing section of FIGS. 8, 9 and the HILBERT filter of FIG. 11 with respect to the portion for performing the image rejection processing.

Next, a fourth configuration example in which the image rejection processing is performed by a complex coefficient filter in the digital signal processing section 20' of the present invention will be described with references to FIG. 12. FIG. 12 is a block diagram showing the fourth configuration example using the complex coefficient filter instead of the complex frequency conversion processing section 124 of FIGS. 8, 9 and the HILBERT, filter of FIG. 11 with respect to the portion for performing the image rejection processing.

In the digital signal processing section 20' of the present invention, an image rejection processing section 123' for performing the image rejection processing after the correction processing in the amplitude correction processing section 121 and phase correction processing section 122 is constituted of the complex coefficient filter. In this case, as shown in FIG. 12, the inner configuration example includes: coefficient a 151 and coefficient b 152 preset to reject the image; multipliers 153 and 154 for multiplying the in-phase component input (i-phase input) by the values of the coefficient a 151 and coefficient b 152, respectively; multipliers 156 and 155 for multiplying the quadrature component input (Q-phase input) by the values-of the coefficient a 151 and coefficient b 152, respectively; an adder 157 for performing the subtraction with respect to the outputs of the multipliers 153 and 155; and an adder 158 for adding the outputs of the multipliers 154 and 156.

Here, the coefficient a 151 and coefficient b 152 correspond to first and second coefficients in the claims.

In the operation of the image rejection processing section 123' in the direct conversion circuit f the present invention, the in-phase (I-phase) and quadrature (Q-phase) signals subjected to the phase and-amplitude corrections and outputted from the phase correction processing section 122 or the amplitude correction processing section 121 in the front stage are inputted into the multipliers 153, 154, 155, 156. The signals are multiplied by the values of the coefficient a 151 and coefficient b 152, and the complex coefficient filter processing is performed by the processing of the adders 157 and 158 to reject the image.

Moreover, the values of the coefficient a 151 and coefficient b 152 are preset for the complex coefficient filter processing performed to reject the image. The offset is finally removed by the operation of the subsequent complex frequency conversion section 127', and the desired wave signal is extracted and outputted to the demodulation processing section 129.

Figure 13:
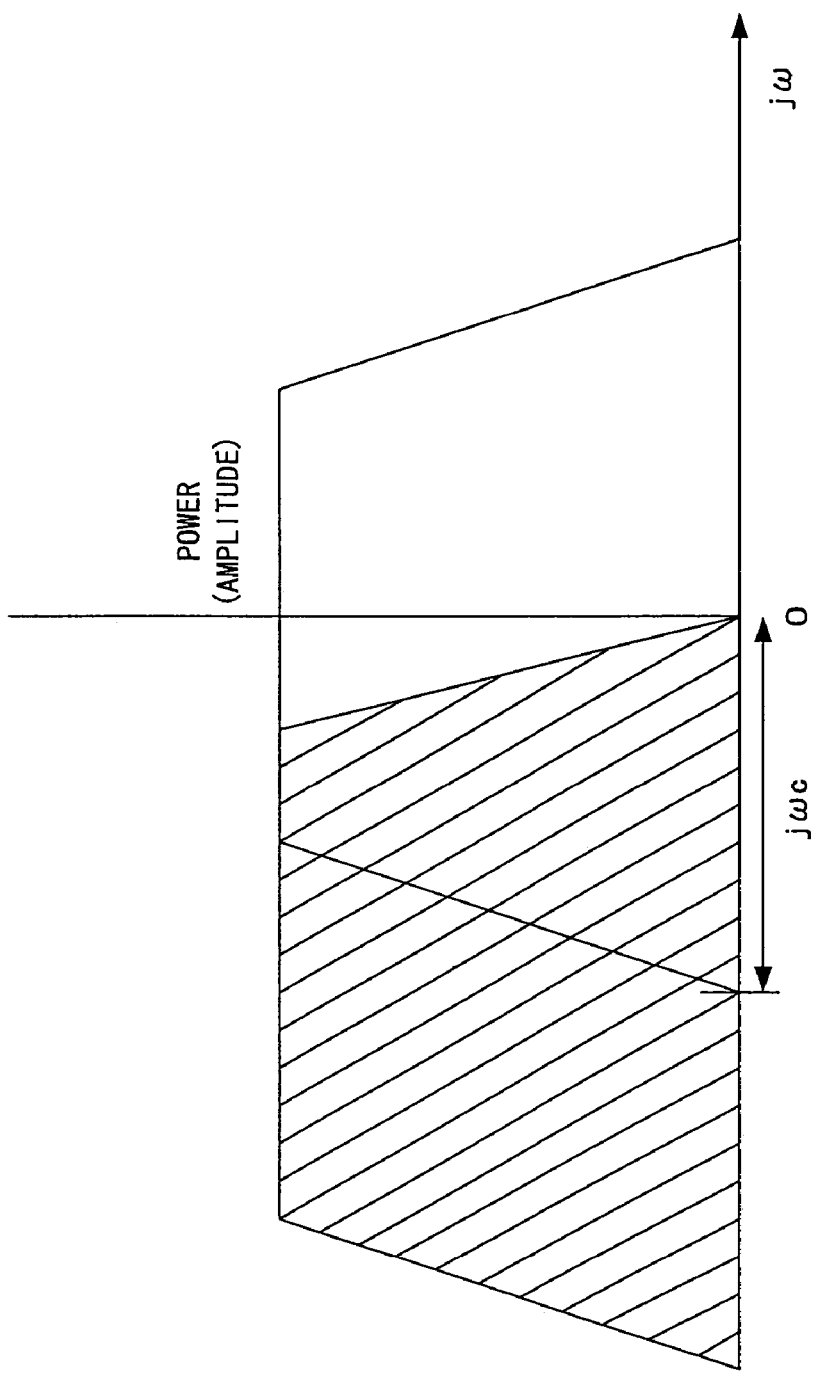
FIG. 13 is an explanatory view showing principle of image rejection by the complex coefficient filter.

Here, the principle in realizing the image rejection shown in FIG. 12 by the complex coefficient filter will be described with reference to FIG. 13. FIG. 13 is an explanatory view showing the principle of image rejection by the complex coefficient filter.

In the complex coefficient filter by the digital processing, as shown in FIG. 13, frequency response of a filter which has frequency characteristics of a real signal is shifted in a frequency axial direction (ω(or −ω_C) in FIG. 13) and obtained.

In the image rejection processing section 123' of FIG. 12, convolution calculation is performed with respect to an input signal (x+jy) of a complex number-and a coefficient (a+jb), of the complex coefficient filter. Therefore, the output signal is as follows.

$$(x+jy)*(a+jb)=a*x-b*y+j(a*y+b*x)$$

(x denotes the in-phase input, y denotes the quadrature input)(* denotes the convolution calculation)

Next, the phase correction processing section 122 in the digital signal processing section 20', which is the characteristic part of the present invention, will be described.

The phase correction processing section 122 detects the phase deviation generated in the analog devices such as the multipliers 3 and 4 and the 90° phase shifter 6 in the front stage by the characteristics, and corrects the deviation in accordance with the detected results.

Figure 14:
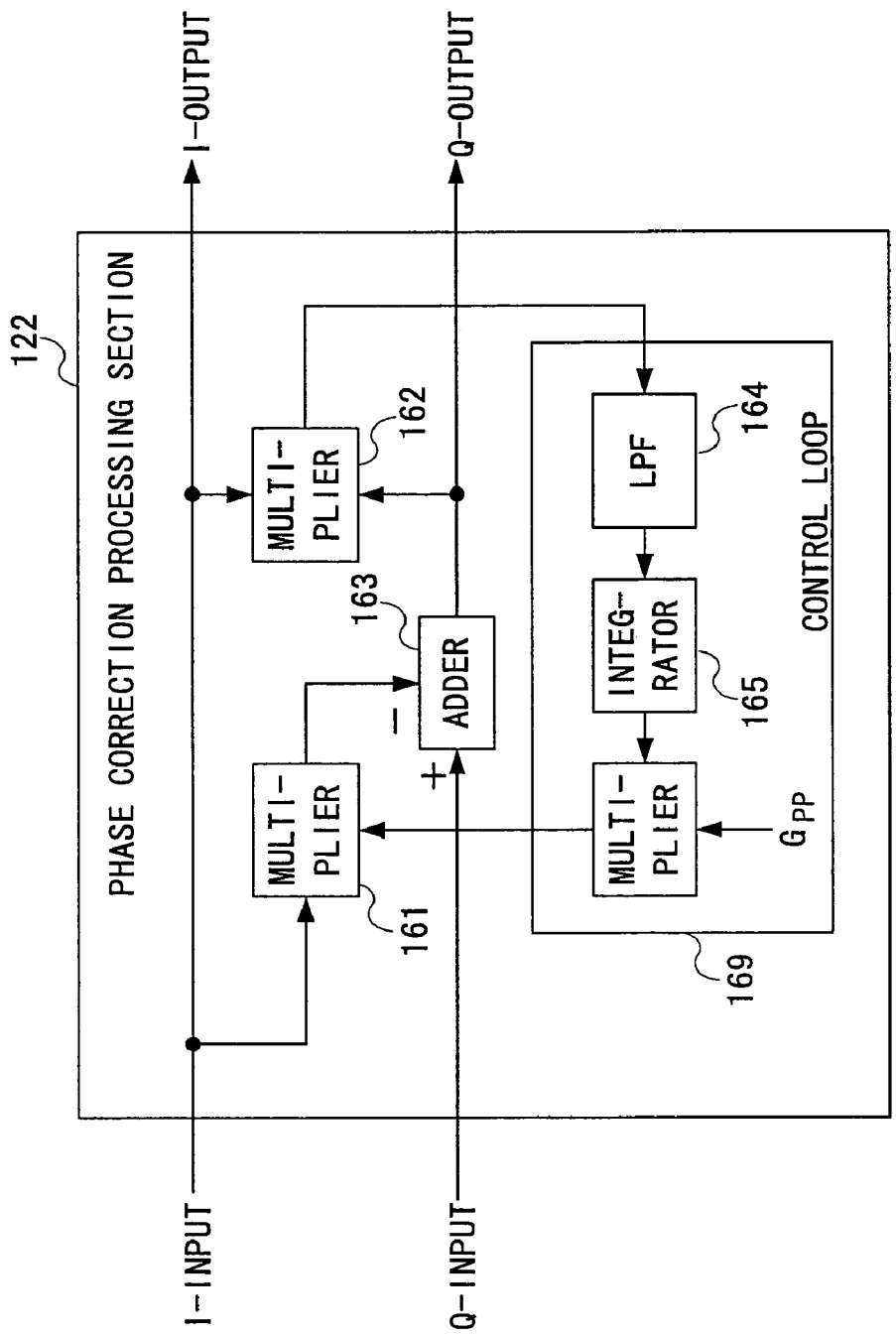
FIG. 14 is a block diagram showing a principle configuration example of a phase correction processing section inside the digital signal processing section according to the second embodiment of the present invention.

The principle configuration example of the phase correction processing section 122 of the present invention will concretely be described with reference to FIG. 14. FIG. 14 is a block diagram showing the principle configuration example of the phase correction processing section 122 inside the digital signal processing section 20' according to the second embodiment of the present invention.

The phase correction processing section 122 in the digital signal processing section 20' of the present invention is constituted of multipliers 161, 162, adder 163, LPF 164, integrator 165, and multiplier 166 in principle.

The multipliers 162 multiplies the in-phase component (I-input) and quadrature component (Q-input) of the digital signal inputted into the phase correction processing section 122 to detect the phase deviation.

The LPF 164, integrator 165, and multiplier 166 converges the phase deviation detected by the multiplier 162 by a control loop.

The multiplier 162, LPF 164, integrator 165, and multiplier 166 constitute a portion for detecting and controlling the phase deviation by the characteristics of the analog device before the digital signal processing section 20'.

The multiplier 161 multiplies the value of the phase deviation converged by the control loop by the in-phase component (Q-input).

The adder 163 subtracts the multiplied result of the multiplier 161 from the quadrature component (Q-input) to obtain the quadrature output (Q-output).

The multiplier 161 and adder 163 constitute a part for correcting the phase deviation by the characteristics of the analog device before the digital signal processing section 20'.

The operation principle of the phase correction processing section 122 in the digital signal processing section 20' of the present invention will be described with reference to FIGS. 1, 8, 14.

Assuming that the input signal via the aerial wire is $x(t)=\cos(\omega_C t+\theta)$ ($\omega_C$: angular frequency of the desired signal), the output signal of the local oscillator 5' is $\cos(\omega_C' t)$, and phase analog of the 90° phase shifter 6 is $90°+\Delta\phi$, the in-phase (I) and quadrature (Q) inputs into the phase correction processing section 122 are represented by the following equation (here, it is assumed that the amplitude deviation between the in-phase (I) and quadrature (Q) inputs is 0 dB).

$$\cos(\omega_C t+\theta)[\cos(\omega_C' t)-j\sin(\omega_C' t+\Delta\phi)]=(1/2)\{\cos(\omega_C'-\omega_C)t+\theta\}-j(1/2)[\sin\{(\omega_C'-\omega_C)t+\theta-\Delta\phi\}]$$

Moreover, the multiplier 162 performs the multiplication processing of the in-phase (I) and quadrature (Q) inputs, and the multiplied result is represented by the following equation.

$$I\ \text{input} \times Q\ \text{input} = -(1/4)\{\cos(\omega_c'-\omega_c)t+\theta\}\sin\{(\omega_c'-\omega_c)t+\theta-\Delta\phi\}$$
$$= -(1/8)\sin(\Delta\phi)$$

For the input signal., it is assumed that $(\omega_C'-\omega_C)t+\theta=\alpha$ and $\cos(\Delta\phi)\approx 1$.

$$\text{Input signal} = (1/2)\{\cos\alpha\} - j(1/2)[\sin(\Delta\phi)\cos(\alpha)+\cos(\Delta\phi)\sin(\alpha)]$$
$$= (1/2)\{\cos\alpha\} - j(1/2)[\sin(\Delta\phi)\cos(\alpha)+\sin(\alpha)]$$

Here, $\cos(\alpha)$ and $\sin(\alpha)$ are the in-phase (I) and quadrature (Q) input-signals, and are therefore I and Q. The signals are multiplied by $\sin(\Delta\phi)$ detected as I in FIG. 14 (the coefficient is normalized at 1) by the multiplier 161, and subtracted from the input signal on a quadrature (Q) side by the adder 163. When the input and output signals of I and Q are normalized at 1, the output is represented by the following equation.

$$\text{Output signal} = \{I\} - j\{I\sin(\Delta\phi) - I\sin(\Delta\phi) + Q\}$$
$$= \{I\} - j\{Q\}$$

Then, the phaser correction processing is carried out.

It is to be noted that the LPF 164, integrator 165, and multiplier 166 of FIG. 14 are devices constituting a control loop 169, and Gpp is a constant which is inversely proportional to a loop time constant.

Next, the amplitude correction processing section 121 in the digital signal processing section 20' which is another characteristic part of the present invention will be described.

The amplitude correction processing section 121 detects the amplitude deviation generated in-the analog devices such as the multipliers 3 and 4 and the 90° phase shifter 6 in the front stage of the digital signal processing section 20' by the characteristics, and corrects the deviation in accordance with the detected results.

Figure 15:
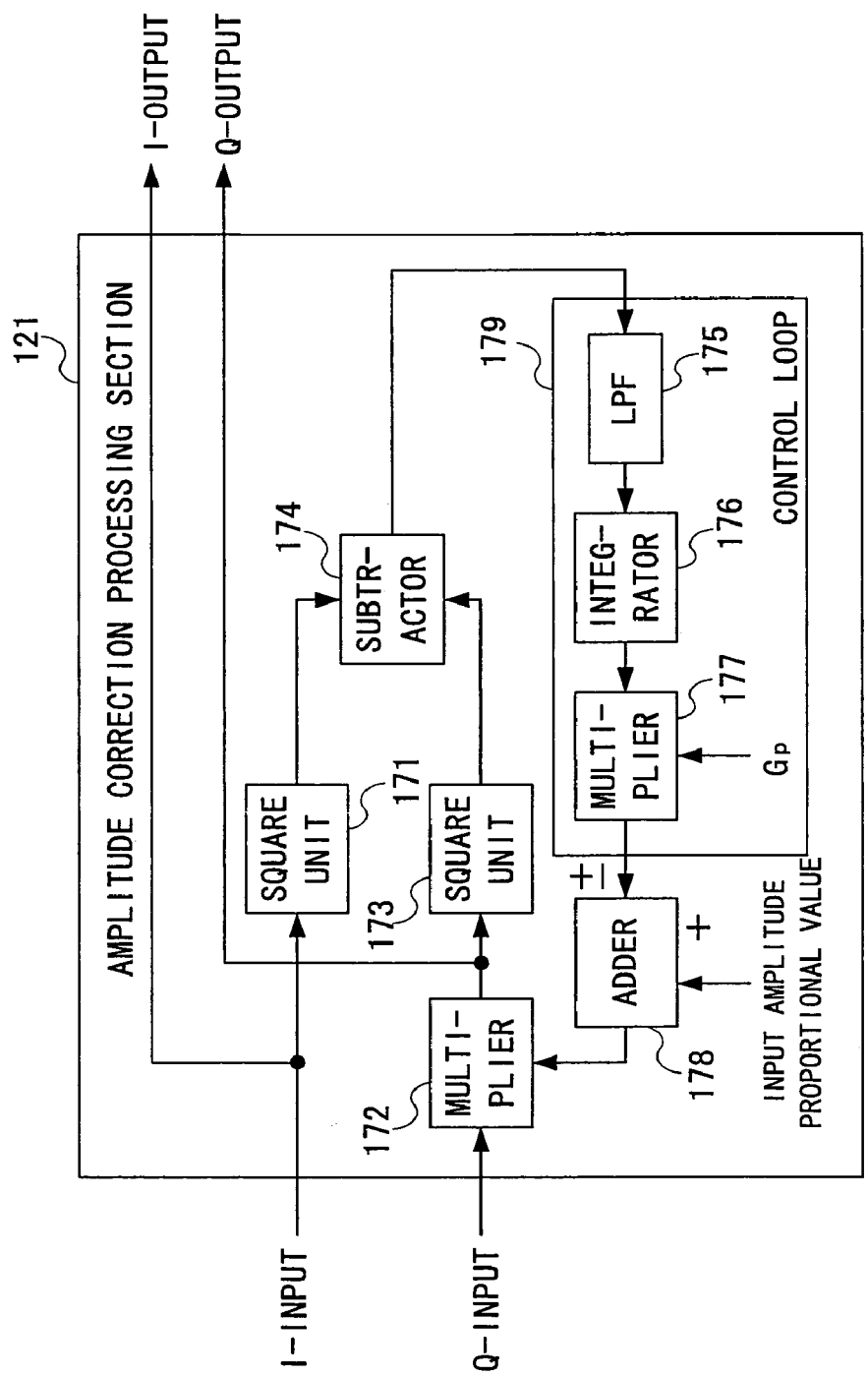
FIG. 15 is a block diagram showing a principle configuration example of an amplitude-correction processing section inside the digital signal processing section according to the second embodiment of the present invention.

Next, the principle configuration example of the amplitude correction processing section 121 in the digital signal processing section 20' of the present invention will concretely be described with reference to FIG. 15. FIG. 15 is a block diagram showing the principle configuration example of the amplitude correction processing section 121 inside the digital signal processing section 20' according to the second embodiment of the present invention.

The amplitude correction processing section 121 in the digital signal processing section 20' of the present invention is constituted of a square unit 171, multiplier 172, square unit 173, subtractor 174, LPF 175, integrator 176, multiplier 177, and adder 178 in principle.

The square unit 171 squares the in-phase component (I-input) of the digital signal inputted into the amplitude correction processing section 121.

The square unit 173 squares the quadrature component (Q-input) of the digital signal inputted into the amplitude correction processing section 121.

The subtractor 174 performs the subtraction with respect to the in-phase component (I-input) square value from the square unit 171 and the quadrature component (Q-input), square value from the square unit 173 to detect the amplitude deviation.

The LPF 175, integrator, 176, and multiplier 177 converge the amplitude deviation detected by the subtractor 174 by the control loop.

The square units 171, 173, subtractor 174, LPF 175, integrator 176', and multiplier 177 constitute a part for detecting and controlling the amplitude deviation by the characteristics of the analog device before the digital signal processing section 20'.

The adder 178 subtracts the value of the amplitude deviation-converged by the control loop from a value proportional to the input amplitude (input amplitude proportional value) or adds the values.

The multiplier 172 multiplies a value based on the amplitude deviation obtained by the adder 178 by the in-phase component (Q-input) to obtain the quadrature output (Q-output).

The adder 178 and multiplier 172 constitute a part for correcting the amplitude deviation by the characteristics of the analog device in the front stage of the digital signal processing section 20'.

The operation principle of the amplitude correction processing section 121 in the digital signal processing section 20' of the present invention will be described with reference to FIGS. 1, 8, 15.

In FIG. 15, assuming that the gain of the multiplier (mixer) 3 shown in FIG. 1 is $A_1$, the gain of the multiplier (mixer) 4 is $A_2$, and $A_1/A_2 = \Delta g$, an output obtained by passing the input signal $x(t) = \cos(\omega_C' t + \phi)$ from the aerial wire through the LPFs 7 and 8 is represented by the following equation.

$$y(t) = x(t)[\cos(\omega_c' t) - j(\Delta g)\sin(\omega_c' t + \Delta\phi)]$$
$$= \cos(\omega_c t + \theta)[\cos(\omega_c' t) - j(\Delta g)\sin(\omega_c' t + \Delta\phi)]$$
$$= \cos(\omega_c' - \omega_c)t + \theta] - j[(\Delta g)\sin(\omega_c' - \omega_c)t + \Delta\phi - \theta)]$$

In FIG. 15, assuming that the in-phase input from the previous stage is I, and the quadrature input from the previous stage is Q, the outputs of the square units 171 and 173 are represented by the following equation.

$$I^2 = (\tfrac{1}{2})(1+\cos\{2[(\omega_C'-\omega_C)t+\theta]\})$$

$$Q^2 = (\Delta g)^2(\tfrac{1}{2})(1-\cos\{2[(\omega_C'-\omega_C)t+\theta+\Delta\phi]\})$$

Here, with the placement with $\Delta g = 1 + \Delta A$, $$\Delta g^2 = 1 + 2\Delta A + \Delta A^2 \approx 1 + 2\Delta A.$$

When the component $\cos\{2[(\omega_C'-\omega_C)t+\theta]\}$ is sufficiently attenuated in the LPF 175, the output of the 175 is represented by the following equation.

$$Q^2 - I^2 = (\Delta g)^2(\tfrac{1}{2}) - \tfrac{1}{2} \approx \Delta A \; (\Delta A^2 \text{ is ignored because } 1 > \Delta A)$$

The LPF 175, integrator 176, and multiplier 177 of FIG. 15 are devices constituting a control loop 179, and Gp is a constant inversely proportional to the-loop time constant.

When the output $(1-\Delta A)$ of the adder 178 is multiplied by the quadrature input $(1+\Delta A)$, on the Q side, the following results.

$(1-\Delta A)(1+\Delta A) \rightarrow 1$ ($\Delta A^2$ is ignored because $1 > \Delta A$) Then, the error is compensated. (Here, $I^2$ and $Q^2$ are normalized at 1.)

Figure 16:
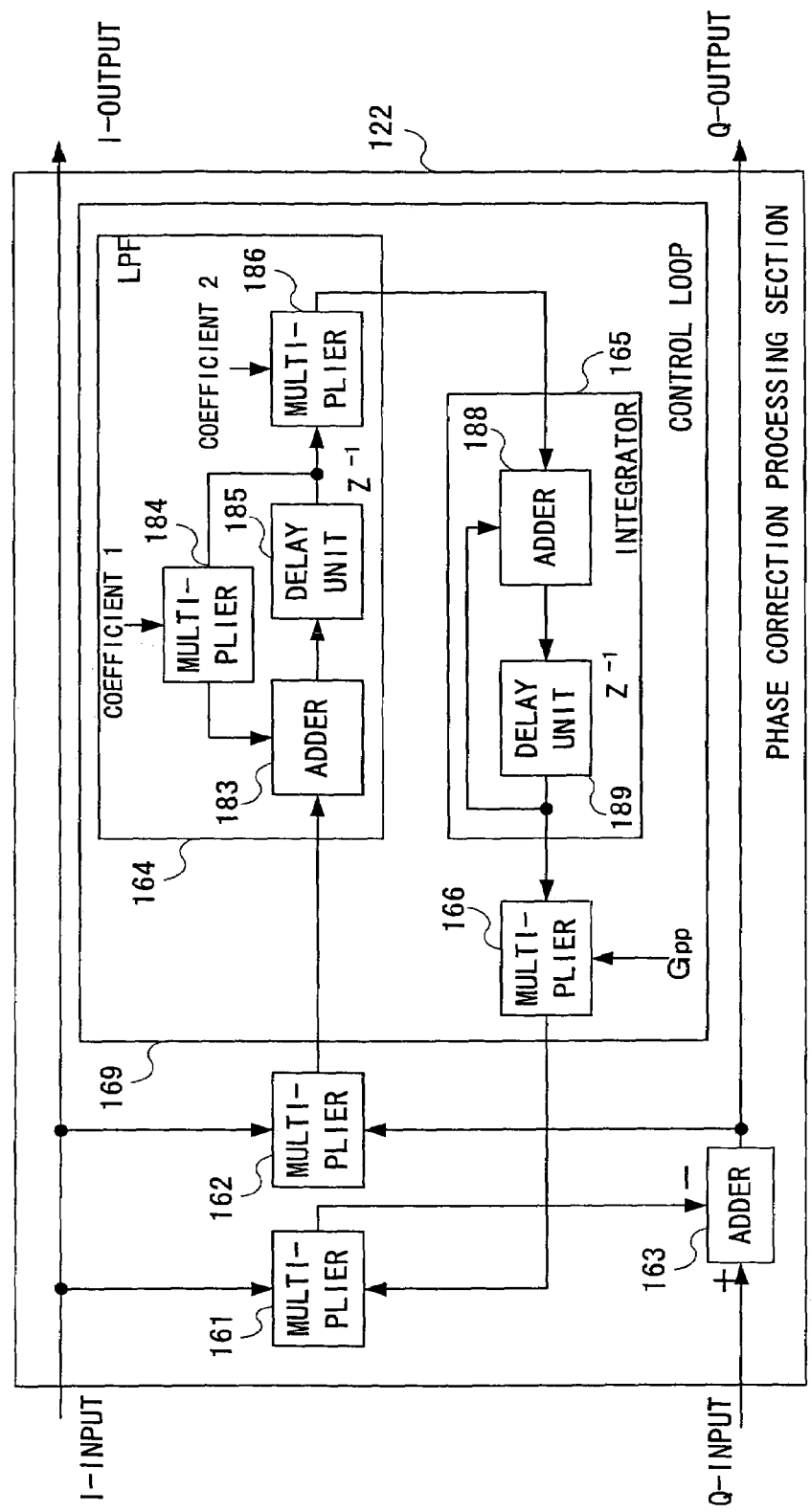
FIG. 16 is a block diagram showing a concrete configuration example of the phase correction processing section in the digital signal processing section according to the second embodiment of the present invention.
Figure 17:
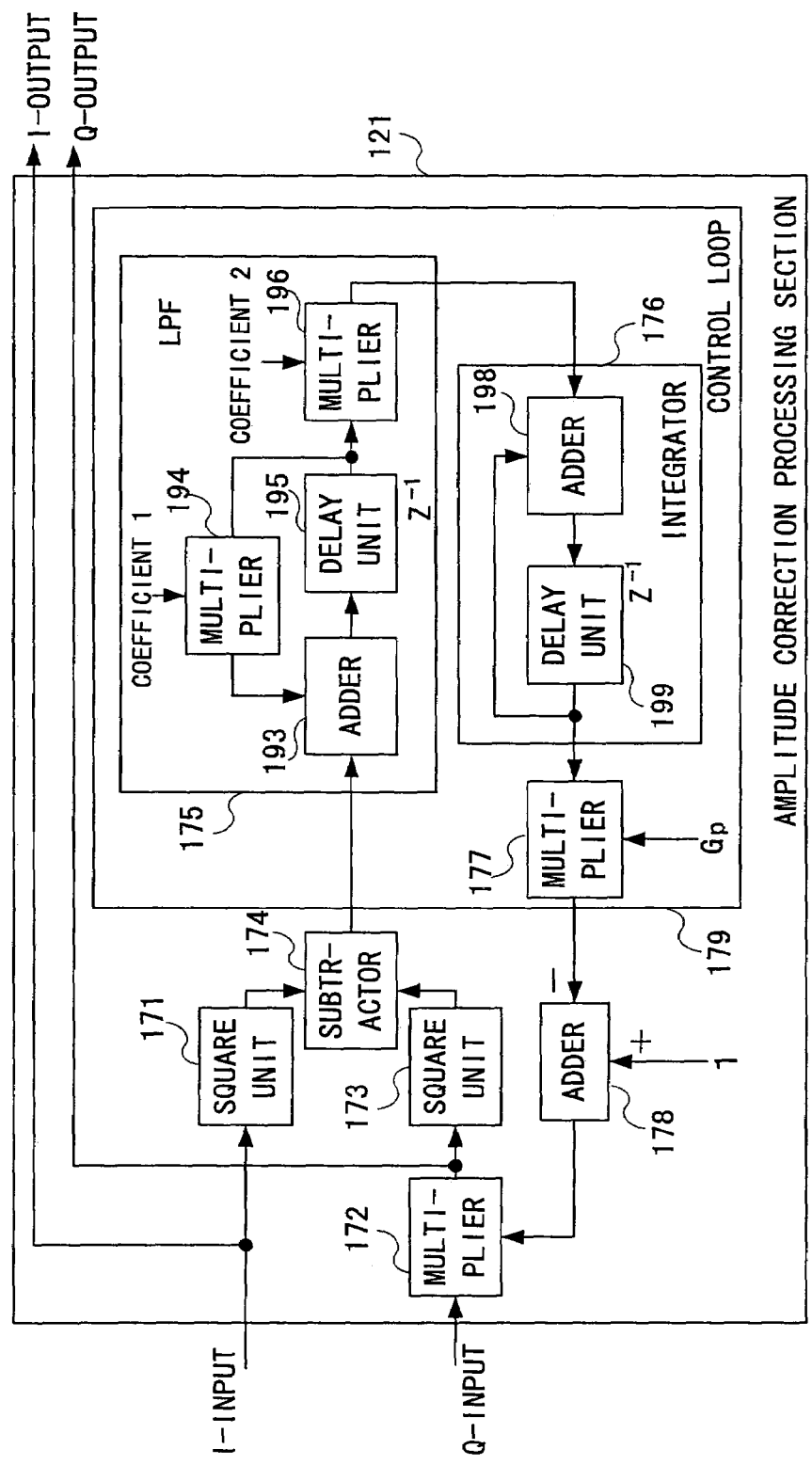
FIG. 17 is a block diagram showing a concrete configuration example of the amplitude correction processing section in the digital signal processing section according to the second embodiment of the present invention.

The concrete configuration example of the phase correction processing section 122 in the digital signal processing section 20' according to the second embodiment of the present invention is shown in FIG. 16, and the concrete configuration example of the amplitude correction processing section 121 in the digital signal processing section 20' of the present invention is shown in FIG. 17. FIG. 16 is a block diagram showing the concrete configuration example of the phase correction processing section 122 in the digital signal processing section 20' according to the second embodiment of the present invention. FIG. 17 is a block diagram showing the concrete configuration example of the amplitude correction processing section 121 in the digital signal processing section 20' according to the second embodiment of the present invention.

For the concrete configuration example of the phase correction processing section 122 in the digital signal processing section 20' of the present invention, as shown in FIG. 16, the LPF 164 constituting the control loop 169 includes: an adder 183 for adding the outputs of the multipliers 162 and 184; a delay unit 185 for delaying the output of the adder 183; the multiplier 184 for multiplying the output of the delay unit 185 by coefficient 1; and a multiplier 186 for multiplying the output of the delay unit 185 by coefficient 2.

Moreover, the integrator 165 includes: an adder 188 for adding the outputs of the LPF 164 and delay unit 189; and the delay unit 189 for delaying the output of the adder 188.

Similarly, for the concrete configuration example of the amplitude correction processing section 121 in the digital signal processing section 20' of the present invention, as shown in FIG. 17, the LPF 175 constituting the control loop 179 includes: an adder 193 for adding the outputs of the subtractor 174 and multiplier 194; a delay unit 195 for delaying the output of the adder 193; the multiplier 194 for multiplying the output of the delay unit, 195 by the coefficient 1; and a multiplier 196 for multiplying the output of the delay unit 195 by the coefficient 2.

Furthermore, the integrator 176 includes: an adder 198 for adding the outputs of the LPF 175 and delay unit 199; and the delay unit 199 for delaying the output of the adder 198.

It is to be noted that the digital signal processing section 20' can be realized by either the hardware which can constitute logic circuits such as the field programmable gate array (FPGA) and digital signal processor (DSP) or the software which performs numeric value calculation.

In order to confirm effectiveness of the present invention, a calculator simulation was carried out. For conditions of the simulation, a maximum band width was assumed to be $(\tfrac{1}{4})f_s$ ($f_s$: sampling frequency), a desired wave frequency was $f_L + f_s/24$ ($f_L$: local oscillation frequency), image wave frequency was $f_L - f_s/16$, an initial phase deviation was 10°, and an initial amplitude deviation was 1 dB.

The initial phase deviation was 10°, the initial amplitude deviation was 1 dB, and the image rejection ratio was about 20 dB, when the correction processing was not performed. On the other hand, when the correction processing was performed, the phase deviation was 0.05°, and the amplitude deviation was converged within 0.01 dB by the correction processing. It has been confirmed that an image suppression ratio of about 60 dB or more can be realized.

According to, the low-IF type direct conversion circuit according to the second embodiment of the present invention, the amplitude correction processing section 121 detects and corrects the amplitude deviation (error) caused by the devices for the analog processing such as the multipliers 3 and 4 and, the 90° phase shifter 6 before the image rejection processing is performed in the digital signal, processing section 20'. Therefore, the amplitude deviation (error) can be removed without increasing the load of the hardware configuration or processing. There is also an effect that the image rejection ratio in the image rejection processing in the-rear stage can be improved.

Moreover, according to the low-IF type direct conversion circuit according to the second embodiment of the present invention, the phase correction processing section 122 detects and corrects the phase deviation (error) caused by the devices for the analog processing such as the multipliers 3 and 4 and the 90° phase, shifter 6 before the image rejection processing is performed in the digital signal processing section 20'. Therefore, the phase deviation (error) can be removed without increasing the load of the hardware configuration or processing. There is also the effect that the image rejection ratio in the image rejection processing in the rear stage can be improved.

Furthermore, according to the low-IF type direct conversion circuit according to the second embodiment of the present invention, the amplitude correction processing section 121 and phase correction processing section 122 detect and correct the amplitudes deviation (error) and phase deviation (error) caused by the devices for the analog processing such as the multipliers 3 and 4 and the 90° phase shifter 6 before the image rejection processing is performed in the digital signal processing section 20'. Therefore, the amplitude deviation (error) and phase deviation (error) can be removed without increasing the load of the hardware configuration or processing. There is also the effect that the image rejection ratio in the image rejection processing in the rear stage can be improved.

Concretely, the image rejection ratio of about 60 dB is possible, which has not heretofore been obtained by the conventional analog or digital processing.

Moreover, according to the low-IF type direct conversion circuit according to the second embodiment of the present invention, in the phase correction processing section 122 in the digital signal processing section 20', the multiplier 162 multiplies the in-phase component (I-input) by the quadrature component (Q-input) of the inputted digital signal to detect the phase deviation generated in the analog devices such as the multipliers 3, 4 and the 90° phase shifter 6 in the front stage by the characteristics. The LPF 164, integrator 165, and multiplier 166 converge the detected result of the phase deviation by the control loop. The multiplier 161 multiplies the converged detected result by the in-phase component (I-input), and the adder 163 subtracts and corrects the multiplied result from the quadrature component (Q-input) to output-the quadrature component (Q). Therefore, by a combination of simple configuration and processing, the phase deviation generated in the analog device can be corrected. The phase deviation (error) can be removed without increasing the load of the hardware configuration or processing. There is also the effect that the image rejection ratio in the image rejection processing in the rear stage can be improved.

Furthermore, according-to the low-IF type direct conversion circuit-according to the second embodiment of the present invention, in the amplitude correction processing section 121 in the digital signal processing section 20', the square unit 171 squares the in-phase component (I-input) of the inputted digital-signal, the squarer unit 173 square the quadrature component (Q-input), and the subtractor 174 performs the subtraction with respect to both square results to detect the amplitude deviation generated in the analog devices, such as the multipliers 3, 4 and the 90° phase shifter 6 by the characteristics. The LPF 175, integrator 176, and multiplier 177 converge the detected result of the amplitude deviation with the control loop. The adder 178 subtracts the converged detected result from the value proportional to the input-amplitude or adds the values. The multiplier 172 multiplies the value based on the amplitude, deviation obtained by the adder 178 by the in-phase component (Q-input) to output the quadrature component (Q). Therefore, by the combination of the simple configuration and processing, the amplitude deviation generated in the analog device can be corrected. Since the correction is carried out by the digital signal processing, the amplitude deviation (error) can be removed without increasing the-load of the hardware configuration or processing. There is also the effect that the image rejection ratio in the image rejection processing in the rear stage can be improved.

As described above in detail, when the image is rejected by the digital signal processing in the conventional low-IF type receiver, the image is not sufficiently suppressed because of the amplitude and phase deviations (errors) caused mainly by the devices for the analog processing, such as the mixer and 90° phase shifter. The defect is improved, when the second embodiment of the present invention is carried out. In the present invention, in the digital signal processing, the amplitude deviation correction by the amplitude correction processing section 121 or, the phase deviation correction by the phase correction processing section 122, or both the corrections are performed before the image rejection processing. After the amplitude and phase deviations caused by the devices for the analog processing are corrected, the image rejection processing is performed. Therefore, there is an effect that the low-IF type receiver can be constituted in which the digital signal processing is performed without increasing the load of the hardware or the processing and in which the image rejection ratio is improved.

According to the present invention, the band is limited in the broad band with respect to the received signal in the broad band limiting section. The first frequency conversion section converts the frequency of the received signal limited in the band in a low band at the local oscillation frequency including the offset with respect to the reception frequency. The digital conversion section converts the received signal whose frequency has been converted into the digital signal at the specific sampling frequency. The image rejection section subjects the digital signal to the image rejection processing, the third frequency conversion section reduces the frequency of the image-rejected signal, the rate conversion section lowers the sampling frequency, the narrow band limiting section extracts the narrow band signal of the desired wave from the broad band signal whose sampling frequency has been lowered, and the second frequency conversion section subjects the extracted narrow band signal to the frequency conversion processing to remove the offset in the receiver. Therefore, the image rejection ratio is improved. Furthermore, there is the effect that the load of the hardware or processing for realizing the channel selection filter to-extract the narrow band signal can be reduced.

According to the present invention, a plurality of sets of the image rejection section, third frequency conversion section, and rate conversion section are continuously connected to constitute the receiver. Therefore, the image rejection ratio is improved. Furthermore, there is the effect that the load of the hardware or processing for realizing the channel selection filter to extract the narrow band signal can be reduced.

According to the present invention, there is provided the receiver in which in the image rejection section the quadrature component of the inputted digital signal is subjected to-the HILBERT conversion by the HILBERT filter, 90-degrees phase shift processing is accordingly performed, the in-phase component of the inputted digital signal is delayed by the same time as the delay time in the HILBERT filter by the delay unit, and outputted, and the adder performs the addition or the subtraction with respect to the outputs from the HILBERT filter and delay unit. Since the image frequency signal is rejected by the digital signal processing, the image rejection ratio can effectively be improved.

According to the present invention, there is provided the receiver in which the rate conversion section is the decimation filter for lowering the sampling frequency by the decimation-in-time processing. Therefore, the image rejection ratio is improved. Furthermore, there is an effect that the load of the hardware or processing for realizing the channel selection filter to extract the narrow band signal by the simple configuration can be reduced.

According to the present invention, there is provided the receiver in which the digital signals of the in-phase and quadrature components detected in the quadrature manner using the local oscillator for oscillating the carrier wave at the frequency including the offset with respect to the reception frequency are inputted, the phase deviation is detected and corrected from the inputted digital signals of the in-phase and quadrature components by the digital signal processing by the phase deviation correction processing section, and subsequently the image frequency signal included in the received signal is rejected by the image rejection section. Therefore, while the load of the hardware or processing is reduced, the phase deviation caused by the analog device is corrected, and the image rejection ratio can effectively be improved.

According to the present invention, there is provided the receiver in which the digital signals of the in-phase and quadrature components detected in the quadrature manner-using the local oscillator for oscillating, the carrier wave at the frequency including the offset with respect to the reception frequency are inputted, the amplitude deviation is detected and corrected from the inputted digital signals of the in-phase and quadrature components by the digital signal processing by the amplitude deviation correction processing section, and subsequently the image frequency signal included in the received-signal is rejected by the image rejection section. Therefore, while the load of the hardware or processing is reduced, the amplitude deviation caused by the analog device is corrected, and the image rejection ratio can effectively be improved.

According to the present invention, there is provided the low-IF type receiver in which the amplitude deviation correction processing section for correcting the amplitude deviation and the phase deviation correction processing section for correcting the phase deviation are disposed with respect to the digital signal, and the image rejection section subjects the digital signal having the amplitude and phase deviations corrected to the image rejection processing. Therefore, while the load of the hardware or processing is reduced, the amplitude and phase deviations caused by the analog device are corrected, and the image rejection ratio can effectively be improved.

According to the present invention, there is provided the receiver in which the phase deviation correction processing section multiplies the in-phase component by the quadrature component of the inputted digital signal to detect the phase deviation, the detected phase deviation is multiplied by the in-phase component, and the multiplied result is subtracted from the quadrature component to output the quadrature component. Therefore, while the load of the hardware or processing is reduced by the simple configuration and processing, the phase deviation caused by the analog device is corrected, and the image rejection ratio can effectively be improved.

According to the present invention, there is provided the receiver in which the amplitude deviation correction processing section calculates the amplitude deviation by the value of the difference between the square values of the in-phase and quadrature components of the inputted digital signal, and the value of the amplitude deviation subtracted or added with respect to the value proportional to the input amplitude is multiplied by the quadrature component to output the quadrature component. Therefore, while the load of the hardware or processing is reduced by the simple configuration and processing, the amplitude deviation caused by the analog device is corrected, and the image rejection ratio can effectively be improved.

What is claimed is:

1. A receiver which converts a band to a base band by a local oscillator of a quadrature carrier wave signal to perform demodulation processing, comprising:
    a broad band limiting section which limits the band with respect to a received signal in a broad band;
    a first frequency conversion section which converts a frequency of the band-limited received signal into that of a low frequency band at a local oscillation frequency having an offset with respect to a reception frequency;
    a digital conversion section which converts the frequency-converted received signal to a digital signal at a specific sampling frequency;
    an image rejection section which subjects the digital signal to image rejection processing;
    a narrow band limiting section which extracts a narrow band signal of a desired wave from an image-rejected broad band signal;
    a second frequency conversion section which performs frequency conversion processing to remove the offset from the narrow band signal;
    a third frequency conversion section which reduces the frequency with respect to the image-rejected signal; and
    a rate conversion section which subjects an output from the third frequency conversion section to rate conversion to lower the sampling frequency,
    wherein the narrow band limiting section extracts the narrow band signal of the desired wave from a rate-converted broad band signal,
    wherein a plurality of sets of the image rejection section, third frequency conversion section, and rate conversion section are continuously connected and disposed; and
    wherein the image rejection section comprises:
    a HILBERT filter which subjects a quadrature component of the inputted digital signal to 90-degrees phase shift processing by HILBERT conversion;
    a delay unit which delays and outputs an in-phase component of the inputted digital signal by the same time as a delay time in the HILBERT filter; and an adder which performs addition or subtraction with respect to outputs from the HILBERT filter and delay unit.

2. A receiver which converts a band to a base band by a local oscillator of a quadrature carrier wave signal to perform demodulation processing, comprising:
- a broad band limiting section which limits the band with respect to a received signal in a broad band;
- a first frequency conversion section which converts a frequency of the band-limited received signal into that of a low frequency band at a local oscillation frequency having an offset with respect to a reception frequency;
- a digital conversion section which converts the frequency-converted received signal to a digital signal at a specific sampling frequency;
- an image rejection section which subjects the digital signal to image rejection processing;
- a narrow band limiting section which extracts a narrow band signal of a desired wave from an image-rejected broad band signal;
- a second frequency conversion section which performs frequency conversion processing to remove the offset from the narrow band signal;
- a third frequency conversion section which reduces the frequency with respect to the image-rejected signal; and
- a rate conversion section which subjects an output from the third frequency conversion section to rate conversion to lower the sampling frequency,
- wherein the narrow band limiting section extracts the narrow band signal of the desired wave from a rate-converted broad band signal; and
- wherein the third frequency conversion section comprises:
- a first SIN table and first COS table predetermined for performing frequency conversion processing to reduce the frequency;
- a first multiplier which multiplies an input signal by a value of the first SIN table to output a in-phase component signal;
- a second multiplier which multiplies the input signal by a value of the first COS table to output a quadrature component signal;
- a second SIN table and second COS table predetermined for performing frequency conversion processing to remove a micro frequency offset;
- a third multiplier which multiplies the in-phase component signal from the first multiplier by the value of the second SIN table;
- a fourth multiplier which multiplies the in-phase component signal from the first multiplier by the value of the second COS table;
- a fifth multiplier which multiplies the quadrature component signal from the second multiplier by the value of the second COS table;
- a sixth multiplier which multiplies the quadrature component signal from the second multiplier by the value of the second SIN table;
- a subtractor which performs subtraction with respect to outputs from the third and fifth multipliers; and
- an adder which adds the outputs from the fourth and sixth multipliers.

3. A receiver which converts a band to a base band by a local oscillator of a quadrature carrier wave signal to perform demodulation processing, comprising:
- a broad band limiting section which limits the band with respect to a received signal in a broad band;
- a first frequency conversion section which converts a frequency of the band-limited received signal into that of a low frequency band at a local oscillation frequency having an offset with respect to a reception frequency;
- a digital conversion section which converts the frequency-converted received signal to a digital signal at a specific sampling frequency;
- an image rejection section which subjects the digital signal to image rejection processing;
- a narrow band limiting section which extracts a narrow band signal of a desired wave from an image-rejected broad band signal;
- a second frequency conversion section which performs frequency conversion processing to remove the offset from the narrow band signal;
- a third frequency conversion section which reduces the frequency with respect to the image-rejected signal; and
- a rate conversion section which subjects an output from the third frequency conversion section to rate conversion to lower the sampling frequency,
- wherein the narrow band limiting section extracts the narrow band signal of the desired wave from a rate-converted broad band signal;
- wherein the image rejection section comprises:
- a HILBERT filter which subjects a quadrature component of the inputted digital signal to 90-degrees phase shift processing by HILBERT conversion;
- a delay unit which delays and outputs an in-phase component of the inputted digital signal by the same time as a delay time in the HILBERT filter; and
- an adder which performs addition or subtraction with respect to outputs from the HILBERT filter and delay unit; and
- wherein the HILBERT filter comprises:
- an odd number of delay units which delay and output input signals are successively connected and are symmetrically divided into front-stage and rear-stage groups centering on a central delay unit among the odd number of delay units;
- a plurality of adders which perform subtraction with respect to the input signals of the delay units of the front-stage group and output signals of the delay units of the rear-stage group, the input and output signals having a symmetrical relation, and an adder which performs the subtraction with respect to the input and output signals of the central delay unit;
- a plurality of multipliers which multiply the output signals from the respective adders by a filter coefficient; and
- an adder which adds outputs from the plurality of multipliers.

4. A receiver which converts a band to a base band by a local oscillator of a quadrature carrier wave signal to perform demodulation processing, comprising:
- a first frequency conversion section which converts a frequency to that of a low frequency band at a local oscillation frequency having an offset with respect to a reception frequency;
- an analog-digital conversion section which converts the frequency-converted received signal to a digital signal from an analog signal;
- a phase deviation correction processing section which corrects a phase deviation of the signal converted to the digital signal;

an image rejection section which subjects the digital signal corrected in phase deviation to image rejection processing;

a narrow band limiting section which extracts a band signal of a desired wave from the image-rejected broad band signal; and a second frequency conversion section which subjects the band signal of the desired wave to frequency conversion processing for removing the offset, wherein the image rejection section comprises a complex coefficient filter comprising:

first and second coefficients predetermined to reject an image;

a first multiplier which multiplies the in-phase component of the input signal by a value of the first coefficient;

a second multiplier which multiplies the in-phase component of the input signal by the value of the second coefficient;

a third multiplier which multiplies the quadrature component of the input signal by the value of the first coefficient;

a fourth multiplier which multiplies the quadrature component of the input signal by the value of the second coefficient;

a subtractor which performs subtraction with respect to outputs from the first and third multipliers; and an adder which adds outputs from the second and fourth multipliers.

5. A receiver which converts a band to a base band by a local oscillator of a quadrature carrier wave signal to perform demodulation processing, comprising:

a first frequency conversion section which converts a frequency to that of a low frequency band at a local oscillation frequency having an offset with respect to a reception frequency;

an analog-digital conversion section which converts the frequency-converted received signal to a digital signal from an analog signal;

an amplitude deviation correction processing section which corrects an amplitude deviation with respect to the signal converted to the digital signal;

an image rejection section which subjects the digital signal corrected in the amplitude deviation to image rejection processing;

a narrow band limiting section which extracts a band signal of a desired wave from an image-rejected broad band signal; and a second frequency conversion section which performs frequency conversion processing to remove the offset from the band signal of the desired wave, wherein the image rejection section comprises a complex coefficient filter comprising:

first and second coefficients predetermined to reject an image;

a first multiplier which multiplies the in-phase component of the input signal by a value of the first coefficient;

a second multiplier which multiplies the in-phase component of the input signal by the value of the second coefficient;

a third multiplier which multiplies the quadrature component of the input signal by the value of the first coefficient;

a fourth multiplier which multiplies the quadrature component of the input signal by the value of the second coefficient;

a subtractor which performs subtraction with respect to outputs from the first and third multipliers; and an adder which adds outputs from the second and fourth multipliers.

* * * * *